(12) United States Patent  
Roach et al.

(10) Patent No.: US 9,132,786 B2  
(45) Date of Patent: Sep. 15, 2015

(54) COLLAPSIBLE AUTOMOTIVE STORAGE CONTAINER

(71) Applicants: Robert Roach, Holt, MI (US); Craig Wieland, Mason, MI (US)

(72) Inventors: Robert Roach, Holt, MI (US); Craig Wieland, Mason, MI (US)

( * ) Notice: Subject to any disclaimer, the term of this patent is extended or adjusted under 35 U.S.C. 154(b) by 0 days.

(21) Appl. No.: 14/270,052

(22) Filed: May 5, 2014

(65) Prior Publication Data

US 2014/0326764 A1    Nov. 6, 2014

Related U.S. Application Data

(63) Continuation-in-part of application No. 14/076,926, filed on Nov. 11, 2013, which is a continuation of application No. 13/447,163, filed on Apr. 13, 2012, now Pat. No. 8,701,950, which is a continuation of application No. 13/087,140, filed on Apr. 14, 2011, now abandoned.

(51) Int. Cl.  
*B60R 9/06* (2006.01)  
*B60P 7/08* (2006.01)

(52) U.S. Cl.  
CPC ............. *B60R 9/065* (2013.01); *B60P 7/0892* (2013.01)

(58) Field of Classification Search  
CPC ....................................... B60R 9/065  
USPC ......... 224/403, 404, 495, 497, 539, 542, 549; 220/6, 4.29, 4.27, 23.83, 23.88, 81, 220/1.5, 9.3, 9.2, 811–816; 312/258, 259, 312/260, 261, 262; 108/11, 14, 51.3, 108/157.14; 296/37.14, 37.6, 37.1; 16/362–364  
See application file for complete search history.

(56) References Cited

U.S. PATENT DOCUMENTS

| 954,918 A |  | 4/1910 | Biro |
|---|---|---|---|
| 1,444,487 A |  | 2/1923 | Volters |
| 1,449,419 A |  | 3/1923 | Kraus |
| 1,489,527 A |  | 4/1924 | Henry |
| 2,529,983 A |  | 11/1950 | White |
| 3,995,764 A | * | 12/1976 | Zagami ..................... 220/263 |
| 4,230,227 A |  | 10/1980 | Kowall et al. |
| 4,260,091 A |  | 4/1981 | French et al. |
| D274,139 S |  | 6/1984 | Suffern et al. |
| 4,673,087 A |  | 6/1987 | Webb |

(Continued)

OTHER PUBLICATIONS

The United States Patent and Trademark Office, Notice of Allowance, issued in connection with U.S. Appl. No. 29/449,629, mailed on Sep. 12, 2014, 29 pages.

(Continued)

*Primary Examiner* — Justin Larson  
*Assistant Examiner* — Phillip Schmidt  
(74) *Attorney, Agent, or Firm* — Hanley, Flight and Zimmerman, LLC

(57) ABSTRACT

An example collapsible automobile storage container includes a plurality of panels arranged with respect to a base. The plurality of panels are interconnected to form an enclosed storage area when erected. The plurality of panels are movable into both a collapsed position and an erected position. The plurality of panels include at least a top panel, a front panel, a back panel, and two side panels, the front panel movable to slide under the base of the container. The example includes a control device to grab and constrain the front panel in position to 1) swing vertically into an erected position against the side panels and base and to 2) keep the front panel from being pulled beyond a front edge of the base.

20 Claims, 37 Drawing Sheets

(56) References Cited

U.S. PATENT DOCUMENTS

| | | | |
|---|---|---|---|
| 4,828,312 A | 5/1989 | Kinkel et al. | |
| 4,848,618 A * | 7/1989 | Yuan et al. | 220/1.5 |
| 4,875,730 A | 10/1989 | Justice | |
| 5,226,302 A | 7/1993 | Anderson | |
| 5,299,704 A | 4/1994 | Thorby | |
| 5,341,950 A * | 8/1994 | Sinz | 220/6 |
| 5,368,210 A | 11/1994 | Wotring | |
| 5,456,514 A | 10/1995 | Justice | |
| 5,782,372 A | 7/1998 | Weiss et al. | |
| 5,853,116 A | 12/1998 | Schreiner | |
| 5,862,932 A | 1/1999 | Walsh et al. | |
| 5,875,912 A | 3/1999 | Hobson | |
| 6,015,178 A | 1/2000 | Haack | |
| 6,070,775 A | 6/2000 | Tolley et al. | |
| D430,103 S | 8/2000 | Scudder | |
| 6,254,162 B1 * | 7/2001 | Faber et al. | 296/39.2 |
| 6,267,427 B1 | 7/2001 | Ziehl | |
| 6,308,873 B1 | 10/2001 | Baldas et al. | |
| 6,401,995 B1 | 6/2002 | Yuille et al. | |
| 6,454,148 B1 | 9/2002 | Cook | |
| 6,507,701 B2 | 1/2003 | Lake | |
| 6,536,826 B1 | 3/2003 | Reed | |
| 6,644,710 B2 | 11/2003 | Seel et al. | |
| 6,749,077 B1 * | 6/2004 | McAlpine et al. | 220/4.29 |
| 6,827,385 B2 | 12/2004 | Mobley | |
| 6,938,807 B2 | 9/2005 | Victor | |
| 6,986,541 B1 | 1/2006 | Haack | |
| 7,097,224 B2 | 8/2006 | Lester et al. | |
| 7,290,820 B1 | 11/2007 | Smith et al. | |
| D658,373 S | 5/2012 | Gros | |
| D659,632 S | 5/2012 | Jordan | |
| D660,781 S | 5/2012 | Ruffino et al. | |
| 8,215,693 B2 | 7/2012 | Ulita | |
| 8,701,950 B2 | 4/2014 | Roach et al. | |
| D722,009 S | 2/2015 | Roach et al. | |
| 8,960,756 B2 | 2/2015 | Roach et al. | |
| 2001/0017474 A1 | 8/2001 | Leitner et al. | |
| 2002/0175530 A1 | 11/2002 | Lake | |
| 2003/0085584 A1 | 5/2003 | Golden | |
| 2003/0098591 A1 | 5/2003 | Leitner et al. | |
| 2004/0232016 A1 | 11/2004 | Dietrich | |
| 2005/0242138 A1 | 11/2005 | Warganich | |
| 2006/0266778 A1 | 11/2006 | Allotey | |
| 2007/0119093 A1 | 5/2007 | Jaskulski | |
| 2008/0264946 A1 | 10/2008 | Moschella et al. | |
| 2009/0056592 A1 | 3/2009 | Threet et al. | |
| 2009/0189404 A1 | 7/2009 | Anderson et al. | |
| 2009/0255967 A1 | 10/2009 | Lueder | |
| 2009/0321434 A1 | 12/2009 | Rothschild et al. | |
| 2010/0252468 A1 * | 10/2010 | Pratte et al. | 206/363 |
| 2010/0264180 A1 | 10/2010 | Allotey | |
| 2010/0270821 A1 | 10/2010 | Ulita | |
| 2010/0320793 A1 | 12/2010 | Aebker et al. | |
| 2012/0181810 A1 | 7/2012 | Alvarino | |
| 2012/0261451 A1 | 10/2012 | Roach et al. | |
| 2012/0261452 A1 | 10/2012 | Roach et al. | |
| 2012/0261938 A1 | 10/2012 | Roach et al. | |
| 2014/0062042 A1 | 3/2014 | Wagner et al. | |
| 2014/0175137 A1 | 6/2014 | Roach et al. | |

OTHER PUBLICATIONS

The United States Patent and Trademark Office, Notice of Allowance, issued in connection with U.S. Appl. No. 13/446,447, mailed on Nov. 13, 2014, pp. 15.

United States Patent and Trademark Office, Non-Final Office action issued in connection with U.S. Appl. No. 13/447,163, mailed on Apr. 1, 2013, 17 pages.

United States Patent and Trademark Office, Final Office action issued in connection with U.S. Appl. No. 13/447,163, mailed on Jul. 18, 2013, 21 pages.

United States Patent and Trademark Office, Advisory action issued in connection with U.S. Appl. No. 13/447,163, mailed on Oct. 10, 2013, 3 pages.

United States Patent and Trademark Office, Non-Final Office action issued in connection with U.S. Appl. No. 13/087,140, mailed on Dec. 28, 2012, 13 pages.

United States Patent and Trademark Office, Final Office action issued in connection with U.S. Appl. No. 13/087,140, mailed on Apr. 25, 2013, 19 pages.

United States Patent and Trademark Office, Non-Final Office action issued in connection with U.S. Appl. No. 13/446,447, mailed on Aug. 6, 2013, 12 pages.

United States Patent and Trademark Office, Non-Final Office action, issued in connection with U.S. Appl. No. 13/446,447, mailed on Mar. 18, 2014, 14 pages.

United States Patent and Trademark Office, Notice of Allowance, issued in connection with U.S. Appl. No. 13/447,163, mailed on Feb. 3, 2014, 58 pages.

United States Patent and Trademark Office, Final Office Action, issued in connection with U.S. Appl. No. 13/446,447, mailed on Jul. 9, 2014, 10 pages.

* cited by examiner

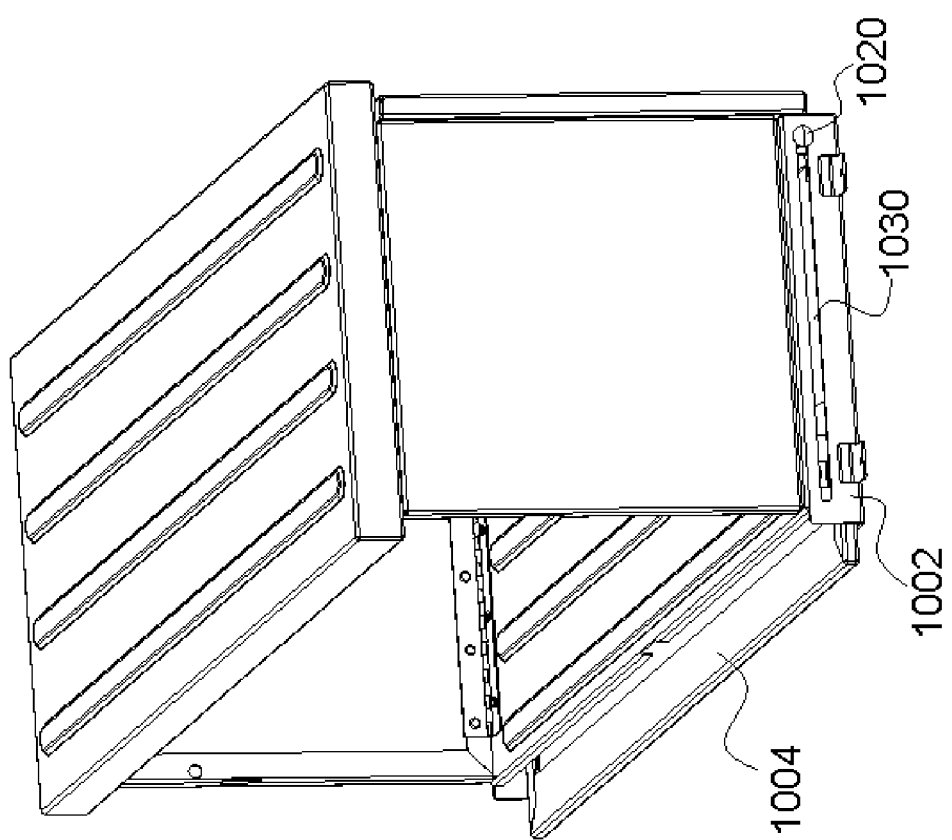

COLLAPSIBLE AUTOMOTIVE STORAGE CONTAINER

CROSS-REFERENCE TO RELATED APPLICATIONS

The present application claims the benefit of and priority to U.S. patent application Ser. No. 14/076,926, filed on Nov. 11, 2013, for "Collapsible Automobile Storage Container," which claims the benefit of and priority to U.S. patent application Ser. No. 13/447,163, filed on Apr. 13, 2012, for "Collapsible Automobile Storage Container," now U.S. Pat No. 8,701,950, which claims the benefit of and priority to U.S. patent application Ser. No. 13/087,140, filed on Apr. 14, 2011, for "Collapsible Storage Container for a Bed of a Truck", now abandoned, each of which is incorporated herein by reference in its entirety.

BACKGROUND

The present embodiments generally relate to collapsible storage containers for automobiles, such as pickup trucks, sports utility vehicles and the like.

Automobiles or vehicles are often used to carry personal and/or commercial cargo. A pickup truck (which may be referred to as a truck) is a motor vehicle or automobile with an open-top rear cargo area which is generally (but does not have to be) separated from a cabin to allow for chassis flex when carrying or pulling heavy loads. The open-top rear cargo area is generally referred to as the bed of the truck. The bed of the truck is generally configured to store, carry, or haul various items. However, because the bed of the truck has an open top (i.e., is not covered), the various items are generally exposed to the weather and/or the possibility of theft. Furthermore, because of the bed of the truck is generally sized to store, carry, or haul larger items (e.g., gravel and wood), smaller items (e.g., groceries or tools) may slide around the bed of the truck. For some items, such as gravel, wood, and landscaping items, being exposed to the possibility of weather, theft, and sliding around is generally not a problem. However, for other items, such as carpentry tools, groceries, and clothes, being exposed to the possibility of weather, theft, and sliding around is generally not acceptable. In some situations, the person using the truck may choose to place these items in the cabin of the truck to prevent exposure. Existing containers are inflexible and inadequate to accommodate a wide variety of cargo types and conditions.

BRIEF DESCRIPTION OF THE DRAWINGS

Example embodiments are described herein with reference to the following drawings.

FIGS. 10A-C illustrate an example collapsible storage container including a pin and groove control device for a panel of the container.

Figure 1A:
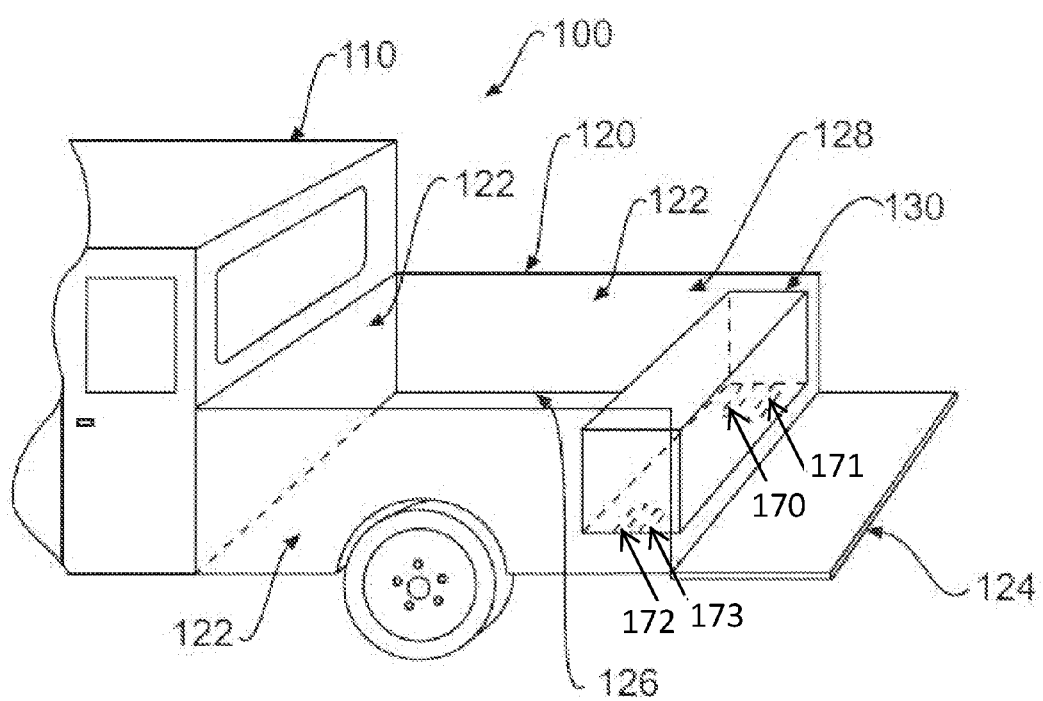
FIGS. 1A-1E illustrate examples of a collapsible storage container in a back of a vehicle such as a truck.

The following detailed description may be better understood when read in conjunction with the drawings which show certain example embodiments. The drawings are for the purpose of illustrating concepts, but it is understood that the inventions are not limited to the arrangements and instrumentality shown in the drawings.

Brief Description

The present embodiments relate to a collapsible storage container (CSC) for an automobile, such as a truck, sport utility vehicle (SUV), all-terrain vehicle (ATV) (e.g., quad, quad bike, three wheeler, four wheeler, etc.), recreational vehicle (RV), and the like. Flat cargo trailers (e.g., for transport of snow-mobiles, motorcycles, ATVs, etc.) can also utilize a collapsible storage container (e.g., collapsing the container while using the trailer to transport the vehicle and then erecting the container to store belongings while using the transported vehicle).

The collapsible storage container is a storage container that may be collapsed or uncollapsed. When collapsed, the storage container allows for all or substantially all of an available area, such as a bed of a truck, a flatbed trailer, etc., to be used. However, when uncollapsed, the storage container may protect items placed in the interior of the storage container from the possibility of weather, theft, and sliding around the vehicle (e.g., the bed of the truck). The collapsible storage container may transition, either manually or electronically, between a collapsed position and uncollapsed position. As a result, for example, the collapsible storage container allows a user to utilize a storage container in the available area, such as the bed of the truck (e.g., when the collapsible storage container is uncollapsed/erected) vertically or horizontally, but also utilize substantially the entire available area, such as the bed of the truck (e.g., when the collapsible storage container is collapsed). In certain examples, the collapsible storage container can be arranged horizontally (e.g., laying flat on a bed of a truck, trailer, etc.) and/or vertically (e.g., positioned against a sidewall of a vehicle, etc.).

As used herein, the term "collapsible" includes foldable, pivotable, expandable, and/or otherwise movable into and out of a collapsed position and/or uncollapsed position. "Collapsed" may include caved in, folded, pivoted, broke down, reduced in size, or otherwise moved from an uncollapsed position to a collapsed position. "Uncollapsed" may include extended, elongated, enlarged, expanded, fanned out, heightened, increased, lengthened, let out, opened, prolonged, prolongated, raised, spun out, spreaded, stretched, unfolded, unrolled, widened, or otherwise moved from a collapsed position to an uncollapsed position. As used herein, "uncollapsed" may also be referred to as "erected."

Certain examples provide a collapsible storage container that is integrated so that all four sides as well as top and bottom are attached to each other and do not need to be separately handled or stored in either the collapsed or uncollapsed position. Thus, a person can choose to store items in the container in a truck bed, trailer bed, jeep storage space, etc., without fear of spillage, etc.

Certain examples provide a collapsible automobile storage container including a plurality of panels arranged with respect to a base. The plurality of panels are interconnected to form an enclosed storage area when erected. The plurality of panels are movable into both a collapsed position and an erected position. The plurality of panels include at least a top panel, a front panel, a back panel, and two side panels. The front panel is movable to slide under the base of the container. The example container also includes a control device to grab and constrain the front panel in position to 1) swing vertically into an erected position against the side panels and base and to 2) keep the front panel from being pulled beyond a front edge of the base.

In certain examples, the container further includes a bottom below the base of the container, the base connected to the bottom to form a cavity between the base and the bottom, the cavity accommodating the front panel when the front panel is moved under the base. In certain examples, the control device is arranged to keep the front panel from inadvertently being pulled out of the cavity created between the base and the bottom of the container. The front panel can span an entire opening from side to side of the cavity created by the bottom and base of the container.

In certain examples, the plurality of panels include at least one of plastic panels and metal panels.

In certain examples, the automobile includes at least one of a truck, an all-terrain vehicle, a recreational vehicle, or a trailer. In certain examples, the container is incorporated into a liner for the automobile. In certain examples the container is configured for arrangement either horizontally or vertically in a bed of the automobile.

In certain examples, in the collapsed position, the side panels lay side by side, the top panel lays on top of the back panel, and a combination of the top panel laying on top of the back panel lays alongside the side panels.

In certain examples, the container includes at least one of tapered latch hooks or rubber hooks connecting panels of the container. In certain examples, the container includes tongue and groove connecting panels of the container.

In certain examples, the control device includes a pair of cam-shaped discs attached to a bottom of the front panel to guide movement and position of the front panel with respect to the base of the container. The cam-shaped discs can include at least one of circle cam discs, square cam discs, or trapezoidal cam discs.

In certain examples, the control device comprises a pin and groove alignment of the front panel and the base. In certain examples, the control device includes a hook and ball connecting and guiding the front panel with respect to the base. In certain examples, the control device includes a block and hinge connecting and guiding the front panel with respect to the base.

In certain examples, the top panel is attached to the back panel such that the top panel is openable with respect to the back panel and side panels.

In certain examples, the front panel comprises a lock to secure the container in at least one of the erected position and the collapsed position. In certain examples, the top panel is movable to be opened or closed with respect to the back panel when the front panel is locked. In certain examples, the front panel is movable when the top panel is down and wherein the top panel is movable when the front panel is up.

Reference herein to "embodiment" means that a feature, structure, or characteristic described in connection with the embodiment can be included in at least one embodiment. The appearance of this phrase in various places in the specification is not necessarily all referring to the same or single embodiment or even different and mutually exclusive embodiments. Separate or alternative embodiments are not mutually exclusive embodiments. Instead, the embodiments described herein, explicitly and implicitly understood by one skilled in the art, may be combined with other embodiments. The embodiments and combinations thereof are all within the scope of this patent document.

It is also worth noting that unless stated otherwise the various embodiments disclosed herein are not limited in their application to the details of design and arrangement of the components set forth in the previous and following description or as illustrated in the drawings. Instead, the previous description, following description, and the drawings focus on presenting concepts of various embodiments. The embodiments described herein may stand alone or be combined with each other.

One or more of the embodiments may be implemented as a method, system, article of manufacture, apparatus, or device. It should be noted that the methods, systems, articles of manufacture, apparatus, and devices provided herein are merely illustrative and should not be considered as limiting. Accordingly, while the following describes example methods, systems, articles of manufacture, and apparatus, the examples provided are not the only way to implement such methods, systems, articles of manufacture, and apparatus.

Detailed Description

FIG. 1A illustrates a truck 100. The truck 100 is described and disclosed herein for purposes of example illustration only. Other vehicles, such as trailers, flatbed trucks, SUVs, ATVs, RVs, etc., can be substituted for the truck 100 in the example of FIG. 1A. The truck 100 includes a cabin 110 and a bed 120. The bed 120 is generally (but does not have to be) separated from (e.g., independent of) the cabin 110 to allow for chassis flex when carrying or pulling heavy loads. The cabin 110 is coupled with the bed 120. As used herein, the term "coupled with" may include a direct connection or indirect connection via one or more intermediary components. For example, the cabin 110 may be welded directly to the bed 120 or connected via a motor-vehicle chassis. The truck 100 may include additional, different, or fewer components.

The truck 100 shown in FIG. 1A is a pickup truck. As will be discussed in more detail below, a pickup truck includes side walls along the edge of the bed 120. However, in some embodiments, a collapsible storage container in accordance with an embodiment may be installed in or used with a vehicle that is pulling a trailer or even a semi-truck. For example, a collapsible storage container may be installed on a trailer that does not include as many (e.g., relative to a pickup) or any side walls along the edges of the floor of the trailer. In another example, a collapsible storage container may be installed in a semi-truck (e.g., near the rear doors, in a vertical plane on the back wall of the cabin, etc.). In another example, a collapsible storage container may be installed in a vertical plane along a back wall and/or side wall of an RV or the like.

The cabin 110 is an enclosed space where at least the driver is seated when driving the truck 100. The cabin 110 may be referred to as a "cab." The cabin 110 may be any now known or later developed cabin of a truck. For example, the cabin 110 may be a standard cabin, extended (or super) cabin, or crew cabin. A standard cabin has a single row of seats and a single set of doors, one on each side. Most pickups have a front bench seat that can be used by two or more people; however, various manufacturers have begun to offer individual seats with a console in the middle of the seats. An extended cabin includes additional space behind the main seating area. This additional space may be accessed by reclining the front bench forward or a rear access door on one or both sides of the cabin 110. A rear access door may be a door hinged on the trailing edge, which is the edge closer to the rear of the truck 100. One or more seats may be placed in the area behind the front bench. For example, in an embodiment, the cabin 110 may include a side-facing seat that can fold into the walls behind the front bench. However, in other embodiments, a full bench may be placed in the back. A crew cabin may be a cabin with four-doors. A crew cabin includes seating for up to five or six people on two full benches and full-size front-hinged doors on both sides. Most crew cab pickups have a shorter bed or box to reduce their overall length.

The bed 120 includes one or more side walls 122, a tailgate 124, and a floor 126. The side walls 122, tailgate 124, and floor 126 are configured to form an open-top cargo area 128. The open-top cargo area 128 may be used for carrying or hauling cargo, such as tools, gravel, groceries, clothes, or other items. Because the bed 120 is an open-top cargo area 128, the various items being carried or hauled are exposed to the weather and the possibility of theft. For some items, such as gravel and wood, weather and/or theft are generally not a problem. However, for other items, such as carpentry tools, groceries, and clothes, being exposed to the weather and theft are generally a concern.

In an embodiment, the bed 120 includes a collapsible storage container 130. As shown in FIG. 1A, the bed 120 includes a collapsible storage container 130 in an uncollapsed position. "Uncollapsed" or "erected" may include extended, elongated, enlarged, expanded, fanned out, heightened, increased, lengthened, let out, opened, prolonged, prolongated, raised, spun out, spread, spread out, stretched, unfolded, unrolled, widened, or otherwise moved from a collapsed position to an uncollapsed position. In the uncollapsed position, the collapsible storage container 130 is not collapsed. In the uncollapsed position, the storage container 130 may be enclosed and configured to store, haul, or carry cargo. In other words, the collapsible storage container 130 may be closed off on all sides. The inside or interior of the storage container 130 may be used as a cargo container to prevent cargo from sliding, being exposed to weather, and/or being stolen.

When in the uncollapsed position, the collapsible storage container 130 is in the bed 120 of the truck 100. The collapsible storage container 130 when uncollapsed may take up space of the bed 120 of the truck. For example, the collapsible storage container 130 when uncollapsed may take up more space of the bed 120 than the collapsible storage container 130 when collapsed. Relative to the collapsed position, the uncollapsed position may require more cubic footage of the bed 120.

In some embodiments, although one or more of the side walls of the collapsible storage container 130 may abut the bed 120 of the truck 100, the inside or interior of the storage container 130 (e.g., the area that stores, hauls, or carries cargo) is disposed in the open-top cargo area 128. For example, when uncollapsed, the inside or interior of the collapsible storage container 130 may be disposed between the side walls 122 and the tailgate 124, as well as being above the floor 126. The interior or inside of the collapsible storage container 130, when uncollapsed, is not inside the side walls of the bed 120 of the truck 100 or beneath the floor 126. For example, the collapsible storage container 130 is not a container inside of a compartment built in a side wall 122. Instead, the inside or interior of the collapsible storage container 130 may be disposed in the open-top cargo area 128. For example, the inside of the collapsible storage container 130 may be in the open-top cargo area when in the uncollapsed position. In the collapsed position, the collapsible storage container 130 may be unable to store, haul, or carry cargo.

The collapsible storage container 130, even in the uncollapsed position, is generally smaller than the bed 120 of the truck 100. For example, the bottom of the collapsible storage container 130, when in the uncollapsed position, may be less than half of the square footage of the bed 120 of the truck. In some embodiments, the bottom of the collapsible storage container 130, when in the uncollapsed position, may be less than a quarter of the square footage of the bed 120 of the truck. In some embodiments, the collapsible storage container 130 may be the same size or almost the same size as the bed 120 of the truck 100. The term "almost" accounts for the physical structure of the collapsible storage container 130.

In certain embodiments, the bottom of the container 130 can include one or more trusses 170, 171, 172, and/or 173 or other sliding supports attached to a bottom edge such that when the panels are in the fully erected position, the trusses 170, 171, 172, and/or 173 provide support. That is, side and front panels may not have an ability to provide support to the base when erected into an uncollapsed state, so the trusses 170, 171, 172, and/or 173 provide this support for them. In other embodiments, due to the configuration and/or material of the panels, one or more trusses 170-173 may not be included in the design.

For example, in a truss-based embodiment, a front panel of the container 130 is housed beneath a base of the container 130 (but perhaps protected by a bottom sheet, portion, cover, or panel underneath). By sliding the panel underneath the base, the container 130 can be placed and effectively used in a variety of positions in a vehicle bed, including at the edge of a truck or trailer tailgate. If the front panel of the container 130 is pulled out and "flipped up" or in the fully erected position, then the front panel is no longer able to provide support to the floor or base of the container 130 (e.g., whether an integrated bottom of the container 130 or part of an installed bed liner). One or more trusses 170, 171, 172, and/or 173 or movable supports are installed on the bottom of the front panel/door edge via hinges, allowing the trusses 170, 171, 172, and/or 173 to be pulled forward and provide support when the front panel cannot provide support due to its position. While the example of FIG. 1A shows the trusses extending along a length of the container 130, one or more trusses 170, 171, 172, and/or 173 can extend along a width of the container 130 instead. The number of trusses and/or other support(s) 170-173 may vary (e.g., a single truss, two trusses, three trusses, four trusses, five trusses, etc.). Trusses may be located to move along a direction of panel movement (e.g., a front panel slides underneath a floor or base panel of the container 130), normal to a direction of panel movement, diagonal to a direction of panel movement, etc. In a non-truss based embodiment, one or more of a circle cam disc, pin and groove, hook and ball, block and hinge, etc., can be implemented to maintain support and front panel position without use of truss(es).

Figure 1B:
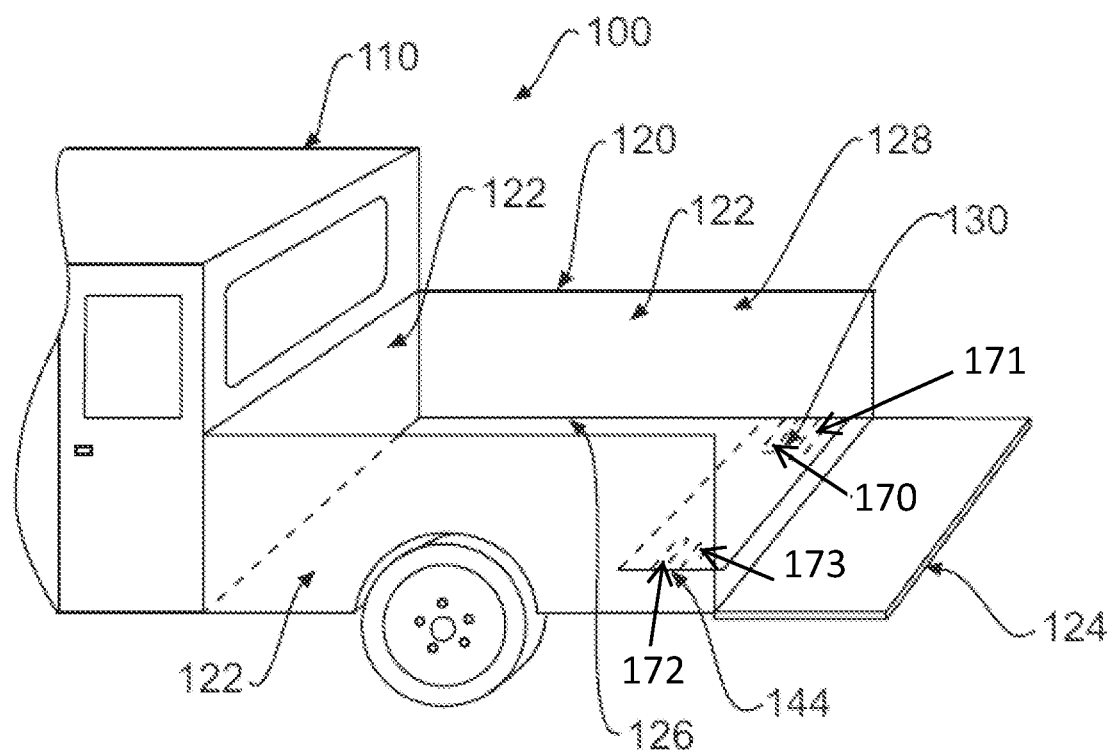

FIG. 1B illustrates the collapsible storage container 130 in a collapsed position. As used herein, "collapsed" may include caved in, folded, pivoted, broke down, reduced in size, or otherwise moved from an uncollapsed position to a collapsed position. As will be discussed in more detail below, "collapsible" includes foldable, pivotable, retractable, or otherwise movable into and out of a collapsed position and/or uncollapsed position. As such, the collapsible storage container 130 is a storage container that provides a user the opportunity to store, haul, or carry cargo in a storage container in the bed 120 of the truck 100 but then, when the bed 120 of the truck is desired, collapse the storage container such that the bed 120 of the truck 100 may be used as a bed 120 of the truck 100.

The collapsible storage container 130 is generally located, when in the uncollapsed position, near the tailgate 124. This location may allow a user to reach the collapsible storage container 130 without climbing into the bed 120 of the truck 100. However, the location of the collapsible storage container 130 is not limited, for example, as long as it is disposed in the bed 120 when in an uncollapsed position. For example, the collapsible storage container 130 may be disposed near the cab 110, as opposed to near the tailgate 124. In this example, a user may reach over a side wall 122 of the bed 120 or climb into the bed 120 to access the collapsible storage container 130. Other locations and ways of accessing the collapsible storage container 130 are included within the scope of this description.

For example, the collapsible storage container 130 may be oriented in a variety of ways in a truck bed or other vehicle platform. While many of the figures show the container 130 oriented with ends facing a side wall of a truck bed, the container 130 may be positioned such that the ends face the cab and tailgate of the truck. Other orientation or positioning is envisioned as well.

The collapsible storage container 130 may be made of one or more materials. For example, the collapsible storage container 130 may be made of plastic, metal (e.g., ferrous or non-ferrous, insulated or non-insulated, etc., such as aluminum, steel, etc.), wood, or other material. The material may be weatherproof. For example, stainless steel or plastic may be used to protect against rain and snow. The material may also prevent or at least deter theft. For example, a hard plastic, such as TEFLON®, may be used to protect against both the weather and theft.

For example, the collapsible storage container 130 may be designed to fit in the back of a truck bed or other vehicle back/space. The sides and top and/or other panels/walls of the example collapsible storage container 130 can be made of a material such as an insulated High Density Polyethylene, Acrylonitrile Butadiene Styrene (ABS) plastic, polypropylene, etc., and hinges, locks, and brackets can be made from stainless steel, aluminum, etc. The example collapsible storage container 130 is engineered to be weather resistant and lockable and also secures cargo from rolling around in the bed of the truck or other vehicle/trailer. The example container 130 is fastened to the truck bed with four stainless steel bolts that, when retracted from the frame of the container 130, apply a strong sideways pressure to the wheel well area, securing the unit to the vehicle. In other examples, the container 130 may be held in place by the weight of the container 130 and friction between the container 130 bottom and the truck/vehicle bed. The container 130 may be built into a vehicle, sold as an accessory by an automotive dealer or manufacturer (e.g., as a bedliner, storage box, etc.), sold as an "after-market" item (e.g., a bedliner, storage box, etc.), etc.

In certain examples, the container 130 is provided as a part of and/or can be connected to a bedliner. For example, in an embodiment, a bedliner is configured to receive a collapsible storage container 130 for a bed of a truck and/or other vehicle, trailer, etc. A bedliner is a liner that covers a bed of a truck. The bedliner may protect a truck bed from damage and can prevent fine-grained cargo from moving around in the bed of the truck. When collapsed, the storage container 130 allows for all or substantially all of a bed of a truck to be used. However, when uncollapsed (and/or perhaps when partially uncollapsed), the storage container 130 may protect items placed in the interior of the storage container from the possibility of weather, theft, and sliding around the bed of the truck.

In an embodiment, a bedliner is configured to cover at least a floor of a bed of a truck and/or other vehicle and receive a collapsible storage container. The collapsible storage container is configured to move into and out of a collapsed position. The collapsible storage container may include a connection device that is configured to connect the collapsible storage container to the bedliner of a bed of a truck and/or other vehicle. The collapsible storage container includes an enclosed area, which is accessible, when the collapsible storage container is out of the collapsed position.

In another embodiment, a bedliner for a bed of a truck and/or other vehicle includes a floor covering, one or more side coverings, and a reception device. The floor covering is sized fit on a floor of a bed of a truck/vehicle. The one or more side coverings are sized to fit on one or more side walls of the bed of the truck/vehicle. The floor covering is coupled with the one or more side coverings such that the floor covering and one or more side covering cover the bed of the truck. The reception device is configured to receive a collapsible storage container. The collapsible storage container is a storage container that is configured to be moved into and out of a collapsed position. The collapsible storage container includes a connection device that is configured to connect to the reception device. The collapsible storage container includes an enclosed area that is located in an open-top cargo area of the bed of the truck when the storage container is moved out of the collapsed position.

In yet another embodiment, a method of manufacturing a bedliner includes forming a floor covering that is sized fit on a floor of a bed of a truck; forming one or more side coverings that are sized to fit on one or more side walls of the bed of the truck, wherein the floor covering is coupled with the one or more side coverings such that the floor covering and one or more side covering cover the bed of the truck; and forming a reception device that is configured to receive a collapsible storage container, wherein the collapsible storage container is a storage container that is configured to be moved into and out of a collapsed position, the collapsible storage container including an connection device that is configured to connect to the reception device, wherein the collapsible storage container includes an enclosed area that is located in an open-top cargo area of the bed of the truck when the storage container is moved out of the collapsed position.

The collapsible storage container 130 may include a security system (e.g., a lock, sensor, etc.). The security system may include an alarm system that alarms a user or others near the collapsible storage container 130 when the interior of collapsible storage container 130 is being accessed with authorization. For example, the collapsible storage container 130 may include an audio alarm that sounds an alarm if the collapsible storage container 130 is opened without disabling or disarming the alarm. The audio alarm may alert others in the nearby area that the collapsible storage container 130 is being opened. The alarm system may include a key pad or wireless remote system that allows the user to disarm the alarm system and access the collapsible storage container 130 without the alarm being triggered.

One or more of the side walls of the collapsible storage container 130 may be configured to provide access to the inside or interior of the collapsible storage container 130. For example, one of the side walls may fold down or up to allow access to the inside of the storage container when in an uncollapsed position. In other embodiments, instead of moving the entire side wall, a door or window may be provided to the inside of the collapsible storage container 130. In some embodiments, both a side wall that provides access (e.g., folds up) and a door may be provided. When something large is to be retrieved from or placed in the inside of the collapsible storage container, one or more side walls may be folded down or up, for example. However, a door or window may also be provided to allow the user to retrieve or place something small on the inside of the collapsible storage container. When access is not needed, the one or more sides may be configured to prevent access to the inside.

When in the collapsed position, the collapsible storage container 130 takes up little (if any) of the open-top cargo area 128. The collapsible storage container 130 may be unable to store, carry, or haul cargo when in the collapsed position. When the storage container 130 in an uncollapsed position, the storage container 130 provides a storage container that may be used to store, carry and haul cargo. The collapsible storage container 130, when uncollapsed, may be weatherproof and/or secure from theft, such that the cargo inside the collapsible storage container 130 is protected from the weather and theft. Weatherproof may include protection against rain, snow, wind, or other weather. Secure from theft may include protection against theft. For example, the collapsible storage container 130 may deter or slow down a theft (e.g., relative to not having a collapsible storage container 130).

The collapsible storage container 130 may be manually and/or electrically moved from a collapsed position to an uncollapsed position. For example, a user may manually move the collapsible storage container 130 between the collapsed and uncollapsed positions. The collapsible storage container 130 may include one or more handles that are used for assisting with converting between the collapsed and uncollapsed positions. In another example, the collapsible storage container may be automatically (e.g., with zero or little assistance from a user) moved. The collapsible storage container 130 may be connected to an electrical system that automatically moves the collapsible storage container 130. A user may initiate movement (e.g., by pressing or pressing and holding a button) between the movements. The electrical system then drives the collapsible storage container 130 between the positions.

The collapsible storage container 130 may include one or more compartments or sections. The interior of the collapsible storage container 130 may include a compartment system that allows a user to compartmentalize the inside or interior of the collapsible storage container 130. For example, the inside or interior may include two compartments. One compartment may be a smaller compartment that is used to carry items that are likely to move around, such as groceries. Another compartment may be larger (e.g., relative to the smaller compartment) and used to carry larger items, such as tools, computers, etc.

The collapsible storage container 130 may include one or more dividers made of plastic or some other rigid material to be installed into the base of the container 130. For example, one or more dividers may be integrated as part of the container 130 or one or more dividers that form part of an installed bed liner that can be "flipped up" to a position perpendicular to the base of the container 130. The flip-up divider(s) may help prevent items in the fully erected container 130 from rolling from side to side as easily as the items might if the dividers were not employed. When the divider(s) are not desired or when the container 130 is in its fully collapsed position the divider(s) are "flipped down" and lie virtually flush with the top of the base, for example.

The collapsible storage container 130 may include a non-skid bottom, non-ski pad(s), etc. For example, the bottom of the container 130 (e.g., either a bottom that is integrated with a base panel as part of the container 130 or a bottom that is part of an installed bed liner, etc.) may be made up of a "non-skid"-type surface. The bottom may be made to be non-skid through material used in the manufacture of the bottom portion itself or by applying a material after manufacture of the bottom to make the bottom skid resistant, for example.

Thus, the container 130 can utilize an attachment system that is non-invasive. That is, a weight of the container 130 itself is sufficient to hold the container 130 in position in the vehicle without having to attach the container 130 to the vehicle by screws, latches, ties, etc. In certain examples, an additional ballast on the bottom of the container 130 can help to secure a position of the container 130.

The collapsible storage container 130 may include one or more attachments or accessories. For example, the collapsible storage container 130 may include a cargo light. The cargo light can be installed on or in one or more sides of the container 130 (e.g., top, back, and/or two sides of the collapsible storage container 130). In its collapsible state, for example, all four "undersides" of the top, back, and side panels of the container 130 are protected due to the way the panels collapse inward or on each other. The cargo light may be an incandescent light, light emitting diode (LED), or the like, and can be powered by a battery situated next to the light, directly from an existing vehicle battery, etc.

The collapsible storage container 130 may include a drain plug or stopper to allow the container 130 to retain and release fluid. For example, a drain plug or other closable opening may be installed in a bottom of the container 130 and/or bedliner. For example, if water (e.g., from rain, melting ice, etc.) or other liquid has collected in the container 130, the plug may be opened to allow the liquid to drain from the container 130.

The collapsible storage container 130 may include handles. For example, one or more handles or other grips may be positioned on or in the outside of the container such that once the container 130 is "un-hooked" or otherwise detached (e.g., from a truck bed or other vehicle, a base or receptacle on a truck bed or other vehicle, bedliner, etc.), the container 130 can be lifted and repositioned.

The collapsible storage container 130 may be insulated. For example, the walls of the container 130 may be constructed from an insulating material. Alternatively or in addition, insulation may be installed in the side(s), front, top, and/or back panels. For example, one or more panels may be insulated with material to delay effects of heat and/or cold transfer from inside the container 130 to outside and/or outside the container 130 to the inside.

The collapsible storage container 130 may include removable straps or netting inside the container 130. For example, straps, netting, and/or other support may be attached to one or more panels of the container 130 (e.g., attached to either of the two sides, top, back or front) such that it spans between two opposing panels to hold stationary items that may otherwise roll or shift in the container 130. The straps, netting, etc., may be removable such that they are installed at times and uninstalled and stored at other times.

The collapsible storage container 130 may include one or more indentations in a panel (e.g., a top or front panel, etc.) whereby a beverage container, such as a cup, bottle, can, etc., can be placed in an indentation. A beverage container placed in an indentation may be prevented from moving on the top of the container 130, for example, as easily as the beverage might without the recess.

It is noted that, in certain embodiments, there may be one or more intermediary positions between a completely collapsed position (i.e., unable to store, carry, or haul any cargo) and a completely uncollapsed position. That is, the container 130 can be not completely erected or uncollapsed and also not completely collapsed. For example, the collapsible storage container 130 may be partially collapsed (also referred to as partially uncollapsed, depending upon viewpoint) and able to store, carry, or haul some cargo. For example, one or more walls or panels of the container 130 can be moved into a position between its collapsed and fully uncollapsed positions, thereby allowing one or more articles to be at least partially contained within the storage container 130 while the container 130 is in a "semi-collapsed" or "partially collapsed" state. In some examples, an amount of cargo that the container 130 is able to hold in a partially collapsed state is less than an amount of cargo that the container 130 is able to hold in an uncollapsed or erected state. In a partially collapsed position, the collapsible storage container 130 is unable to store, carry, or haul as much cargo as when in the completely uncollapsed position but is still able to store, carry, or haul some cargo. However, because the collapsible storage container 130 is partially collapsed, the storage container 130 does not require as much cubic footage of the bed 120 as the storage container 130 in a completely uncollapsed position.

The collapsible storage container 130 includes an attachment system 144. The attachment system 144 may be used to connect or attach the collapsible storage container 130 to the bed 120 of the truck 100. The attachment system 144 may include screws, hooks, rods, snap-in modules, or other mechanisms for securing or fixing the storage container 130 to the bed 120 of the truck 100. In some embodiments, as will be discussed in more detail below, the attachment system 144 may be distributed between the collapsible storage container 130 and the bed 120 (or other component, such as a bed liner, that attaches to the bed 120). For example, the collapsible storage container 130 may include a male component that connects (e.g., snaps, screws, or otherwise attaches) into a female component of the bed 120 or vice-versa.

The collapsible storage container 130 may include a support system. The support system may be used to support the collapsible storage container 130 in an uncollapsed position. The support system may be rigid side walls (e.g., as shown in FIG. 1A), a hook system, a telescoping rod system, or other system that is able to hold or maintain the collapsible storage container 130 in an uncollapsed position.

For example, as shown in FIG. 1A, in some embodiments, the side walls of the collapsible storage container 130 are able to support themselves in the uncollapsed position. The side walls of the collapsible storage container 130 may be rigid and able to remain in an uncollapsed position. However, in other embodiments, the collapsible storage container 130 may need additional support.

In an embodiment, a rod and/or hook and latch system may be used to support one or more panels of the collapsible storage container 130. Hooks may be tapered and/or untapered latch hooks, for example. For example, two hooks may be located on the outside of each side panel with two hooks located on the inside of each side panel that are tapered from a "pointed end" to a thicker or more robust middle and base. As a latch is turned or pushed into the receiving hook, the taper forces a tighter and tighter fit between the two panels.

The tighter fit allows the container 130 to be weather tight when the latches (e.g., all six latches) are fully turned or pushed, for example.

In an embodiment, side panels may include tongue and groove sides. For example, side panels may include a tongue molded into an edge that lodges into a groove of a corresponding top, back, or front panel when the container 130 is fully erected. Using this design, potential incoming moisture is forced through a tortuous path up, over and around this tongue prior to being able to enter the cavity created by the fully erected (uncollapsed) collapsible storage container. The tongue may be constructed from a solid material, a flexible and/or crushable material (such as a semi-hard plastic or rubber), etc.

Foldable Storage Container Example(s)

Figure 1C:
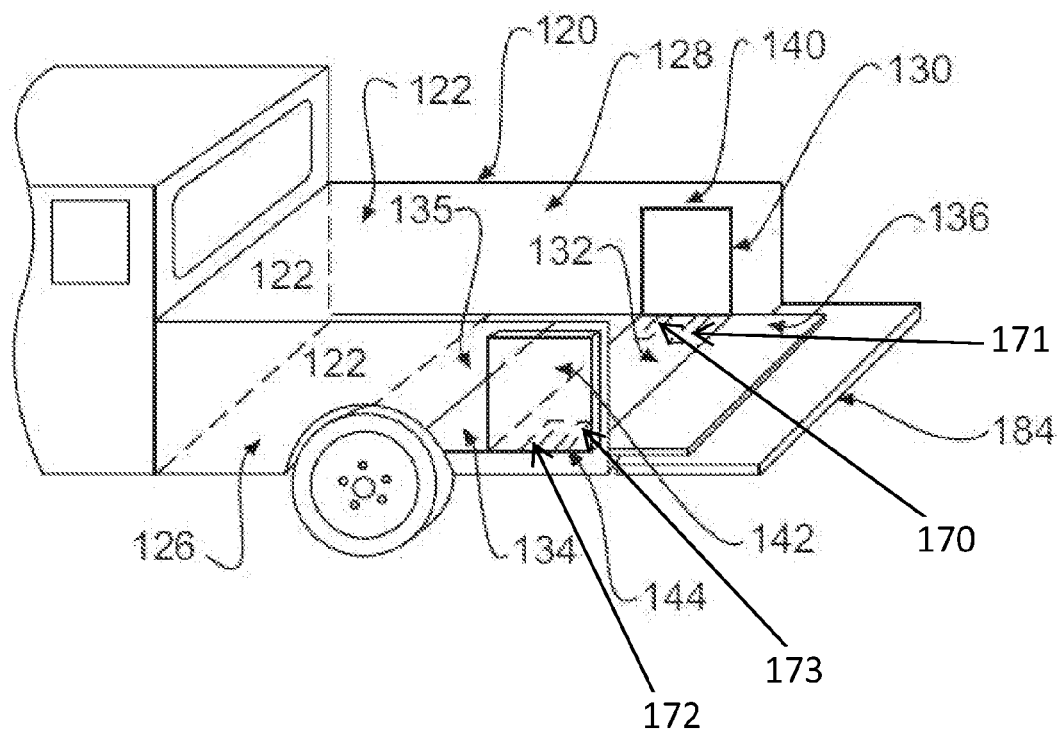
Figure 1D:
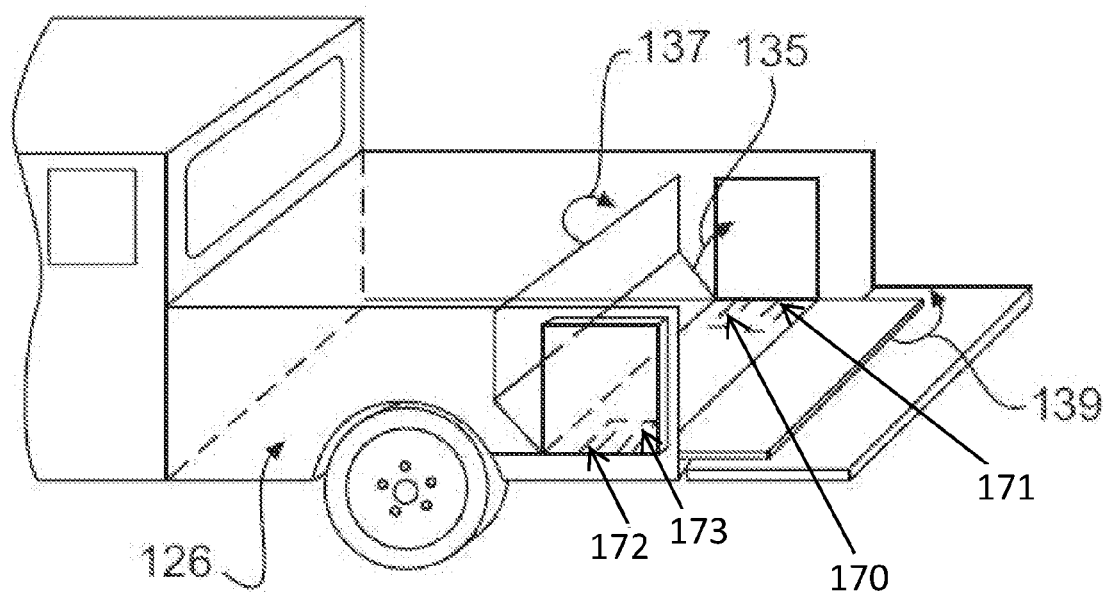

FIGS. 1C-1D illustrate additional views of a collapsible storage container 130 that is foldable. The collapsible storage container 130 may be folded from a collapsed position into an uncollapsed position. Likewise, the collapsible storage container 130 may be unfolded from the uncollapsed position into a collapsed position.

As shown in FIG. 1C, the collapsible storage container 130 includes a base side panel 132, a front side panel 134, a back side panel 136, a top side panel 138, a left side panel 140, and a right side panel 142. It is noted that the descriptions "base," "front," "back," "top," "left," and "right" are from the perspective of facing the front of the truck 100. (e.g., as used herein, the "front" is toward the cabin 110, the "bottom" is toward the ground, the "right" is toward the driver side of the truck in the United States). However, other descriptions may be used, for example, in the event that the collapsible storage unit 130 or truck 100 is rotated. The descriptions are intended to help illustrate the concepts and not limit the mechanics, structure, or various embodiments. A panel may be referred to as a wall or side of the collapsible storage container 130.

FIG. 1C illustrates the collapsible storage container 130 in a collapsed position. In the collapsed position, the collapsible storage container 130 provides use of all or substantially all of the open-top cargo area 128, which is the area between the side walls 122, tailgate 124, and floor 126. For example, in some embodiments, as shown in FIG. 1C, four of the panels 132-138 of the collapsible storage container 130 lay flat on the floor 126 (and/or tailgate) of the bed 120, while two of the panels 140, 142 are positioned against or adjacent to the sides 122 of the bed 120. Substantially the entire bed 120 may be used for carrying and hauling. As used at least in this example, "substantially" relates to the space taken up by the side walls of the collapsible storage container 120 when lying on top of or adjacent to the side walls 122, tailgate 124, and/or floor 126. For example, the term "substantially" takes into account the physical structure of the collapsible storage container 130. In another example, one or more of the side walls 122, tailgate 124, and floor 126 include (e.g., are manufactured with) an indentation that allows the side panels of the collapsible storage container 130 to be flush with the remaining portion of the sides 122, tailgate 124, and/or floor 126. The indentations allow for the entire bed 120 to be used for carrying and hauling, since the side walls of the collapsible storage container 130 are moved into the indentations when in a collapsed position. The indentation may take into account the physical structure of the collapsible storage container 130. For example, if one or more of the panels are an inch thick, then the indentation may be an inch deep to allow the one or more panels to lay in the indentation.

FIG. 1D illustrates the collapsible storage container 130 being folded from a collapsed position into an uncollapsed position. As shown by arrow 135, the front side panel 134 may fold toward the left and right side panels 140, 142. As shown by arrow 139, the back side panel 136 may fold toward the left and right sides 140, 142. In other words, the front side panel 134 and back side wall 136 may fold toward each other and connect with the left and right side panels 140, 142 to form an open-top storage container. However, as shown by arrow 137, as the front side wall 134 is folded up, the top side wall 138 may fold onto, along, or adjacent to the top of the left and right side walls 140, 142 to provide the top to the collapsible storage container 130. When folded together and connected, the side walls 132-142 form an enclosed area that may be used for storage, for example, while driving or parked.

As shown in the examples of FIGS. 1C and 1D, one or more supports (e.g., truss(es), etc.) 170-173 can be provided underneath the base 132 of the container 130 to provide support for the container 130 as one or more panels 134, 136, 140, 142 are moved. For example, side walls 140, 142 can slide under the base panel 132. In this example, the front panel 134 folds forward, and the sides 140, 142 slide under the base 132. In an embodiment, the sides 140, 142 and the front 134 have trusses 170, 171, 172, and/or 173 or other sliding supports attached to their bottom edges such that when the panels are in the fully erected position, the trusses 170, 171, 172, and/or 173 provide support. That is, side and front panels may not have an ability to provide support to the base when erected into an uncollapsed state, so the trusses 170, 171, 172, and/or 173 provide/replace this support for them.

For example, in an embodiment, a front panel, side panel, back panel, and/or other panel of the container 130 is housed beneath a base of the container 130 (but perhaps protected by a bottom sheet, portion, cover, or panel underneath). In certain examples, the trusses 170, 171, 172, and/or 173 extend underneath the base in the direction of movement as the panel is moved and provide/replace this support that had been provided by the panel when slid or otherwise positioned underneath the base. By sliding the panel underneath the base, the container 130 can be placed and effectively used in a variety of positions in a vehicle bed, including at the edge of a truck or trailer tailgate.

In an embodiment, if the front door of the container 130 is pulled out and "flipped up" or in the fully erected position, then support that the front door provided to the floor of the container (e.g., whether an integrated bottom of the container 130 or part of an installed bed liner) is no longer provided. One or more trusses 170, 171, 172, and/or 173 or movable supports are installed on the bottom of the front panel edge via hinges, allowing the trusses 170, 171, 172, and/or 173 to be pulled forward and provide support when the front panel cannot due to its position. Thus, one or more movable side panels and/or front panel can be supported by one or more trusses 170-173 in collapsed and/or uncollapsed position.

In a non-truss-based embodiment, one or more of a circle cam disc, pin and groove, hook and ball, block and hinge, etc., can be implemented to maintain front panel position without use of truss(es). For example, a panel 134, 136, 140, 142 can slide under the base panel 132. A stopping mechanism, such as a circle cam disc, pin and groove, hook and ball, block and hinge, etc., stops the moving panel 134, 136, 140, or 142 from moving beyond (e.g., coming free from) its connection with the base 132 and allows the panel 134, 136, 140, or 142 to move smoothly between an uncollapsed position perpendicular to the base 132 and a collapsed position underneath the base 132.

All or some of the walls 132-142 may stay connected using connection system. The connection system may include magnets, snaps, screws, latches, hinges, or other connectors that connect all or some of the panels 132-142 together. For example, in an embodiment, an inter-lock mounting system may be used. In this example, the front side wall 134 may include a male snap-in mount that inter-locks with a female snap-in mount on the left and right side walls 140, 142. The other side walls may also include other similar inter-locking connectors. In an embodiment, the connection system may allow some, but not all, of the panels 132-142, to move. This may be advantageous when the collapsible storage container is uncollapsed. For example, the connection system may allow the top panel 138 to move while the other panels 132-136 and 140-142 to remain connected. This will allow a user to access the inside or interior of the collapsible storage container 130, for example, when uncollapsed.

In some embodiments, the left and right side panels 140, 142 may also lay flat on the floor 126 when collapsed. This may reduce the interior size of the collapsible storage container 130 but may also reduce the complexity of the design of the collapsible storage container 130.

Figure 1E:
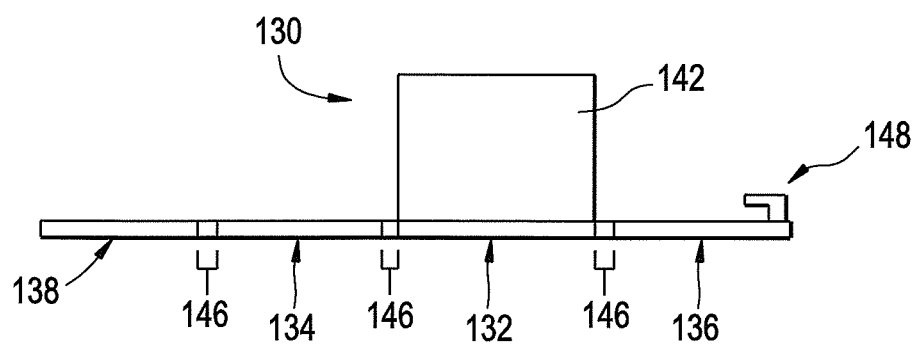

FIG. 1E illustrates a side perspective of the collapsible storage container 130 of FIGS. 1C-1D. As shown in FIG. 1E, in addition to the panels 132-142, the collapsible storage container 130 includes hinges 146 that couple at least some of the panels 132-142 with each other. The hinges 146 may be rubber hinges, living hinges, or other hinges. In some examples, the hinges 146 are weatherproof (e.g., able to prevent or deter water or other liquid from entering into the inside of the collapsible storage container 130). In other examples, a gasket is used to fill space between panels to prevent leakage without and/or apart from a weatherproof hinge. The hinges 146 may allow the sides to collapse. For example, in the embodiment shown in FIG. 1E, the hinges 146 allow all or some of the panels 132-142 to fold away from each other when the collapsible storage container 130 is collapsed and fold toward each other (e.g., to form an enclosed storage container) when uncollapsed.

The collapsible storage container 130 may include a lock 148. The lock 148 may be a locking system (e.g., including one or more locks) that secures the collapsible storage container 130 when uncollapsed. The lock 148 may prevent one, some, or all of the walls from moving and providing access to the interior of the collapsible storage container 130. In some embodiments, the lock 148 may include a lock and key system on an edge of a first panel and an edge of a second panel. A user may insert a key into the locking mechanism to lock the collapsible storage container 130. The locking mechanism, when the collapsible storage container 130 is collapsed, may not extend out of the sides and snag objects being placed into the bed 120 of the truck 100.

In certain examples, an attachment system may be an invasive or non-invasive attachment system. An invasive attachment system is an attachment system that enters into the bed of the truck (e.g., is screwed into the bed of the truck). However, a non-invasive attachment system is an attachment system that attaches to the bed of the truck without entry into the truck.

Figure 2A:
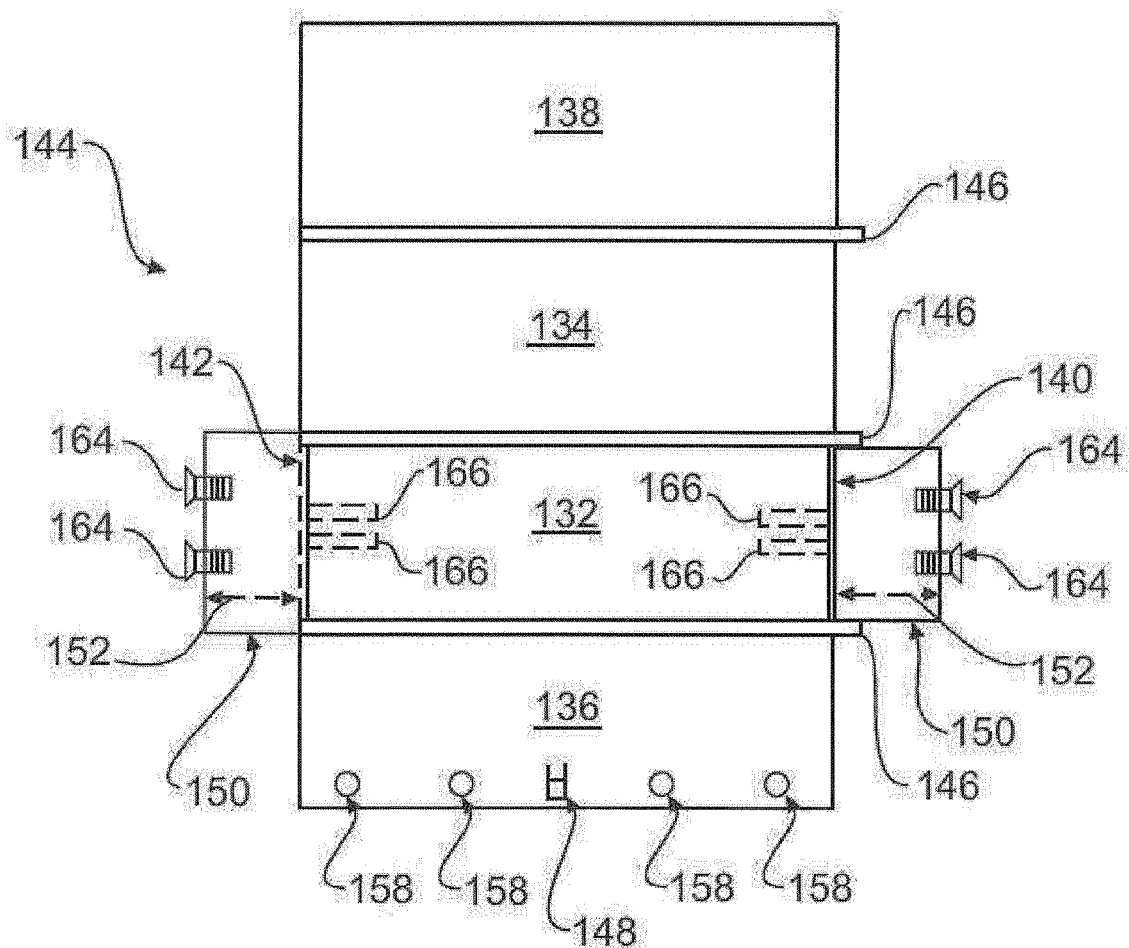
FIGS. 2A-3 illustrate examples of a collapsible storage container with an attachment system.

FIG. 2A illustrates an example embodiment of a collapsible storage container 130 in a collapsed position (e.g., laying flat). The collapsible storage container 130 may include an attachment system 144. As mentioned above, the attachment system 144 may be used to attach the collapsible storage container 130 to a bed of the truck. For example, the attachment system 144 may be used to hold, set, put, or place the collapsible storage container in a rigid, permanent, non-movable, or secure position. The attachment system 144 may prevent someone from easily removing the collapsible storage container 130 from the bed of the truck.

FIG. 2A illustrates an example of an embodiment of an attachment system 144. The attachment system 144 is a non-invasive attachment system. The attachment system 168 includes an attachment plate 150, pressure bolts 164, a rod and shaft system 166, and a gusset 160. Additional, different, or fewer components may be provided. The collapsible storage container 130 may include or be configured to connect to an attachment system 150. The attachment system 144 attaches, secures or fixes the collapsible storage container 130 to the bed 120. The attachment system 144 may be attached to both the collapsible storage container 130 and the bed 120.

As shown in FIG. 2A, the attachment plate 150 can be secured to the base side panel 132. Securing the attachment plate 150 to the base side panel 132 may include screwing, nailing, gluing, hinging, clamping, manufacturing as a single piece, or otherwise attaching the two together. The pressure bolts 164 may be backed out of the attachment plate 150 up against the side walls 122 of the bed of the truck to secure the attachment plate 150 to the bed of the truck. The pressure bolts 164 may include holes that allow a lock (e.g., a pad lock) to be placed through the bolt 164 to prevent it from being loosened. Once the screws are tight against the bed of the truck, the attachment plate should not be able to be removed or move around.

Figure 2B:
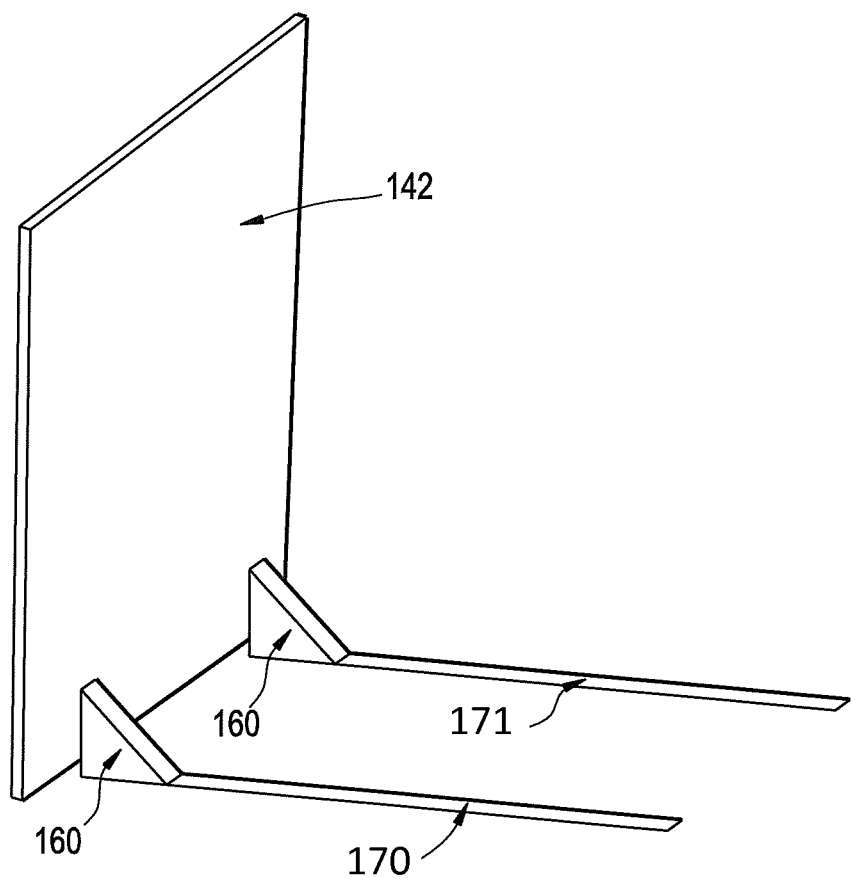

As shown in the embodiments of FIGS. 2A-2B, the attachment system 144 may include one or more rods 170-171 and associated shaft 166. The rod(s) 170-171 may extend into the shaft 166. The shaft 166 may be a hole or tunnel that extends into the side panel 132.

As shown in FIG. 2A, the base side panel 132 may include one or more shafts 166. The shafts 166 are sized to receive a rod 170, 171 (shown in FIG. 2B) that is connected to the side panel 142. The rod 162 guides the side panel 142 as shown by arrow 152. FIG. 2B illustrates a side panel 142 and the rod 162. A gusset 160 may be used to further support the connection between the rod 162 and side panel 142.

As shown in FIG. 2B, rod and shaft and/or other support allow the side panels 140, 142 to slide or otherwise move adjacent to the side walls 122 of the bed of the truck so that as much of the bed of the truck may be used as possible. When in a collapsed position, the side walls 140, 142 may be moved away from the base side panel 132 and toward the edges of the bed of the truck. When in a fully erected position, the glide bars can provide support to the container at the base 132.

Figure 3:
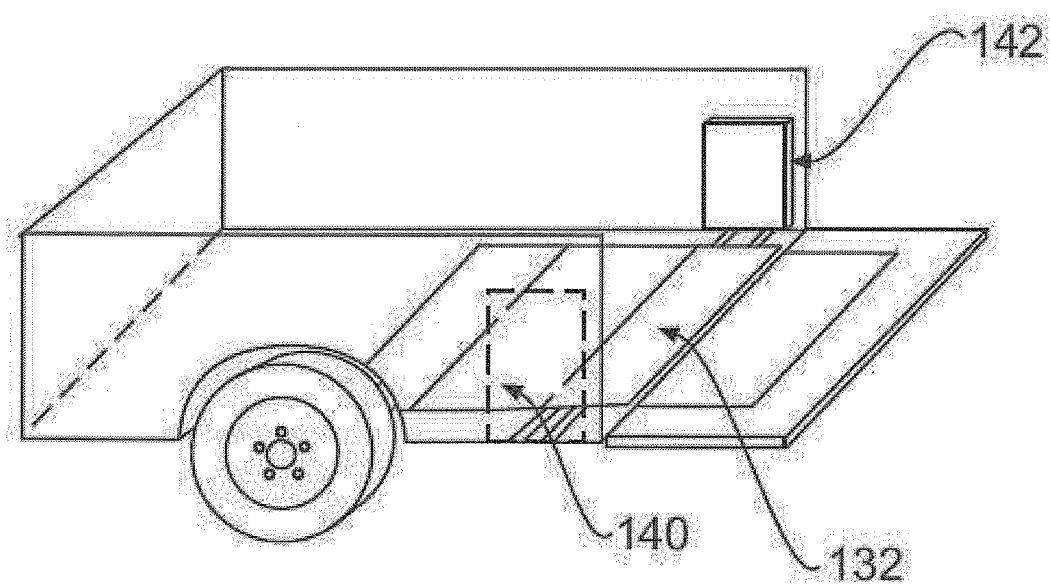

In some embodiments, the attachment system 150 may allow all, some, or one of the side panel 132-142 to move. For example, as shown in FIG. 3, the attachment system 150 may include one or more tracks, rods and shafts, or other connectors that allow for movement. FIG. 3 illustrates an embodiment where the side panels 140, 142 are extended away from the base side panel 132 and toward the side walls of the bed of the truck.

It should be noted that instead of using a rod and shaft system as described above, the attachment system 144 may include a track system or telescoping system to provide for the movement of all, some, or one of the panels, for example. However, in other embodiments, the attachment system 144 does not allow for movement of any of the panels. Instead, with exception of the folding movement, the panels of the collapsible storage container 130 are not movable. For example, the left and right side walls 140, 142 may not move as shown by arrow 152 of FIG. 2A.

FIGS. 4A-4D illustrate an embodiment of a collapsible storage container 130. The embodiment(s) shown in FIGS. 4A-4D is/are similar, with respect to folding, to the embodiment(s) shown in FIGS. 1C-1D, except that the side panels 140, 142 also fold down. In other words, all of the side walls 132-142, including the side panels 140, 142 fold down into a collapsed position, as will be described and illustrated in more detail below.

Figure 4A:
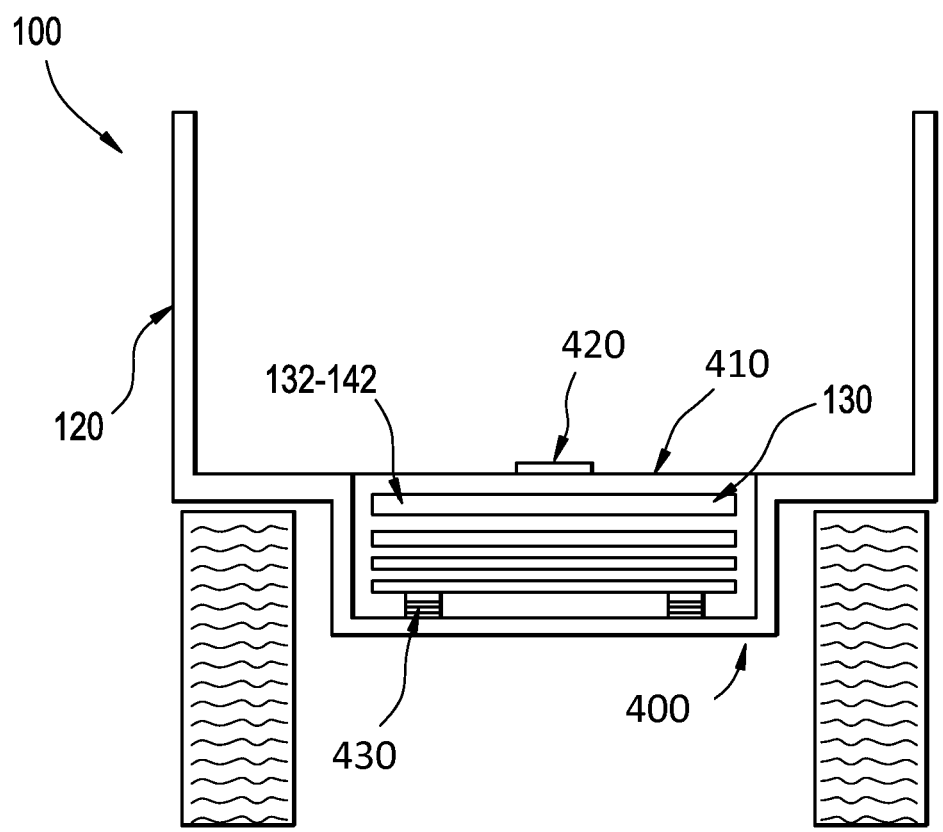
FIGS. 4A-4D illustrate examples of a collapsible storage container

FIG. 4A illustrates a rear-view of a collapsible storage container 130 in the bed 120 of a truck 100. The bed 120 includes a stow-away compartment or indentation 400. The stow-away compartment 400 may be built into (e.g., integrated) into the bed 120, for example, during manufacture of the bed 120. The compartment 400 may allow the collapsible storage container 130, when in a collapsed position, to be out of the way of the bed 120, such that the entire bed 120 may be used to haul, carry, or store cargo.

In some embodiments, the compartment 400 includes a door 410 with a handle 420. The handle 420 may be used to open the door 410. The handle 420 may be configured to allow a user to lift the door, for example, when the door 410 is closed using gravity or a light attaching mechanism, such as magnets or snaps. However, in other embodiments, the handle 420 is connected to a latch (e.g., including a lock) that latches the door 410. The handle 420 may be used to open the latch that is securing the door 410 shut.

The door 410 may be opened and shut. When the door 410 is opened, the collapsible storage container 130, which is collapsed when in the compartment 400, may be moved into an uncollapsed position. For example, in some embodiments, the door 410 may be opened and the collapsible storage container 130 removed from the compartment 400. The collapsible storage container 130, in the collapsed position, may attach to a guide, rail, spring, pivot, or other mechanism that allows the collapsible storage container 130 to be removed from the stow-away compartment 400. In some embodiments, once the collapsible storage container 130 is removed, the door 410 is closed. However, in other embodiments, the door 410 does not need to be closed. Instead, the door 410 needs to allow the collapsible storage container 130 to be moved into an uncollapsed position. For example, the door 410 may be on a hinge that moves the door 810 out of the way or the door 410 may slide out of the way.

Figure 4B:
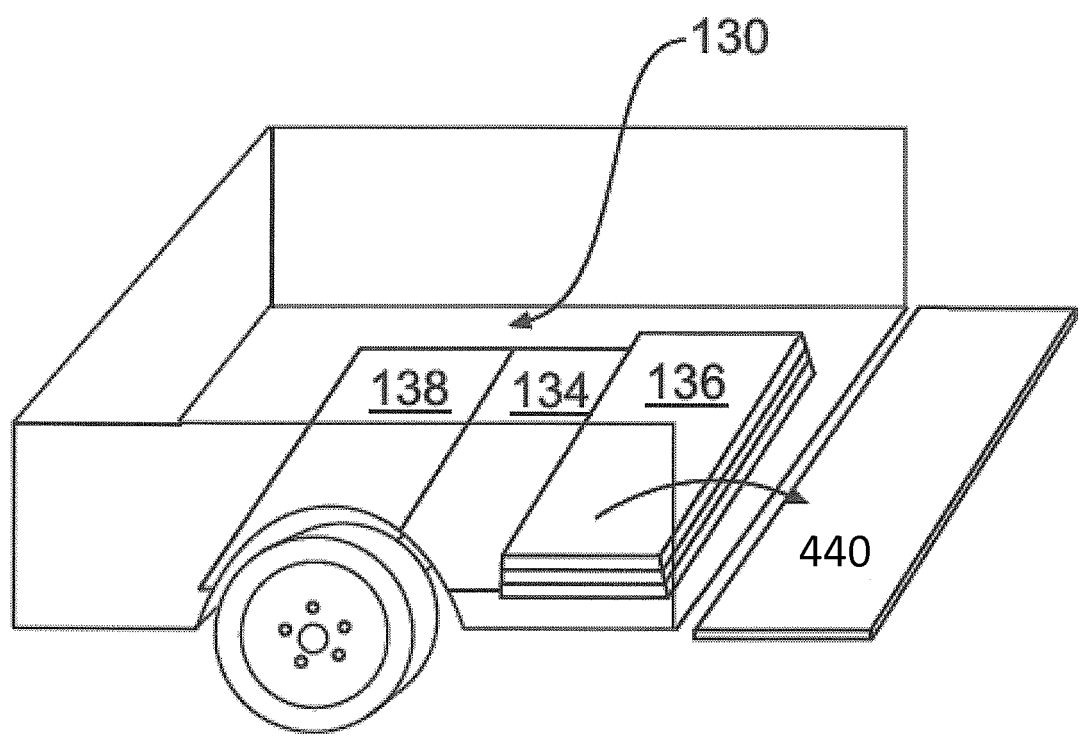
Figure 4C:
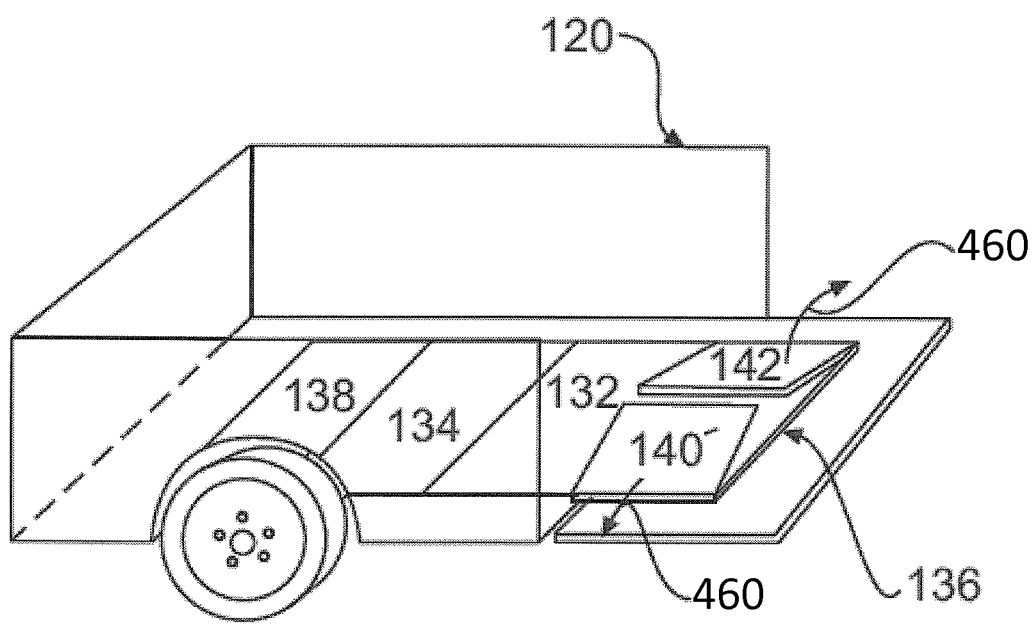

As shown in FIG. 4B, once the collapsible storage container 130 is removed from the stow-away compartment or other indentation 400, the panels 132-142 may be unfolded as shown in FIGS. 4B and 4C. The folding may be similar, but not necessarily the same, as the folding of FIG. 1D. For example, as shown in FIG. 4B, the front and top panels 134, 138 may be folded toward the front of the truck 100. The back and side panels 136, 140, 142 may be folded toward the back of the truck 100 (e.g., the tailgate), as shown by arrow 440. As shown in FIG. 4C, the side panels 140, 142, which are connected to the back panel 136 in this example, may be folded toward the sides of the bed 120, as shown by arrows 460.

Figure 4D:
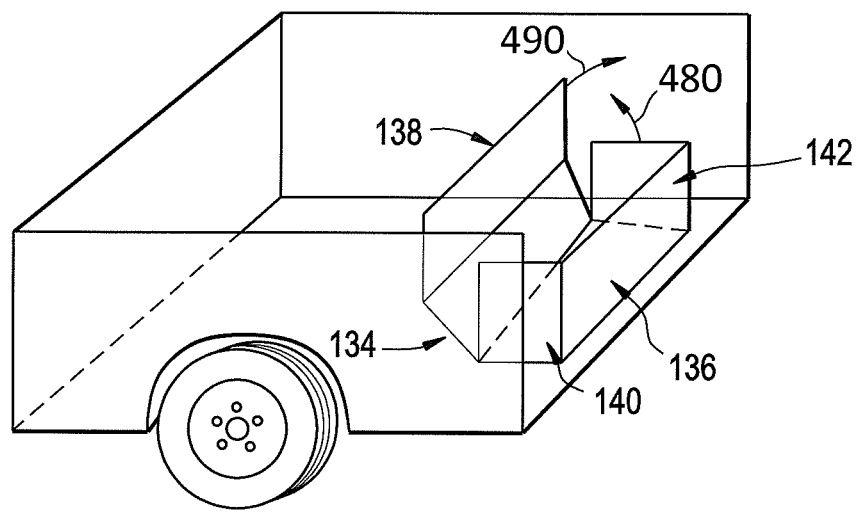

As shown in FIG. 4D, the back panel 136 and side panels 140, 142 may be folded toward the front of the truck 100, as shown by arrow 480. In FIG. 4D, the back panel 136 and side panels 140, 142 have already been folded. The arrow 480 shows the folding motion that already occurred. The front panel 134 and top panel 138 may be folded backwards, as shown by arrow 490. The various panels may then be connected together. Once connected together, for example, using a connection system, the collapsible storage container 130 is in the uncollapsed position. When the collapsible storage container 130 is moved back into the collapsed position, the user may unconnect the panels 132-142 and move the collapsible storage container 130 back into the stow-away compartment 400 of FIG. 4A. The door 410 may then be shut.

It should be noted that the method of folding and unfolding described herein are examples. Depending on how the collapsible storage container 130 is configured, the folding and unfolding may occur differently. For example, in FIG. 4C, the side walls 140, 142 may be connected to the base panel 132, front panel 134, or the top panel 138. This may change the way that the collapsible storage container 130 is collapsed and uncollapsed (e.g., folded and unfolded).

For example, top panel 138 and back panel 136 may fold in on themselves such that the panels collapse on top of each other, with the back panel 136 on bottom and the top panel 138 remaining on top.

In another example, one or more front, back and/or side panels can be configured to slide under the base panel 132 of the container 130. In this example, the panel 134 folds forward, and the sides 140, 142 slide under the base 132. In an embodiment, one or more of the panels 134, 136, 140, 142 have one or more of a circle cam disc, pin and groove, hook and ball, block and hinge, etc., attached to the panel(s) 134, 136, 140, 142 to maintain support and guide movement and panel position as the panels( ) 134, 136, 140, 142 move between collapsed and uncollapsed positions.

In an example, the collapsible storage container 130 may include a front door or panel that slides underneath the base, which may be integrated into the container 130 as part of the container unit, as part of a bed liner already installed on top of a truck bed, or the like.

In some embodiments, the bottom of the compartment 400 may be the bottom of the inside or interior of the collapsible storage container 130. For example, the base panel 132 may not be needed. Instead, the other panels may form a container around the compartment 400. This may expand the size of the interior of the collapsible storage container 130. However, when uncollapsed, the inside or interior of the collapsible storage container 130 extends above the floor 126 and into the open-top cargo area.

The compartment 400 may be used for various embodiments of the collapsible storage container 130. For example, a collapsible storage container 130 with bellows may be placed in the stow-away compartment. In another example, a collapsible storage container 130 with one or more telescoping rods may be stored in the compartment 400. The telescoping rods may extend out of the stow-away compartment, for example. In yet another example, a collapsible storage container 130 that is pivotable or retractable may be stored in the stow-away compartment.

Bed-Liner Storage Container(s)

A collapsible storage container may be connected to a bed liner. A truck bed liner is a covering that may protect a truck bed from damage and can prevent fine-grained cargo from moving around in the bed of the truck. A bed liner may be a drop-in bed liner. A bed liner is installed in the bed of the truck, for example, by snapping, screwing, or otherwise connecting the bed liner to the bed of the truck. A bed liner may be made of, for example, plastic, rubber, or other material. A bed liner may be made in a single piece (e.g., that is fitted to the bottom and sides of the bed of the truck) or separate pieces (e.g., that are installed individually on the bottom and sides of the bed of the truck). In some embodiments, a bed liner may be removable.

Figure 5A:
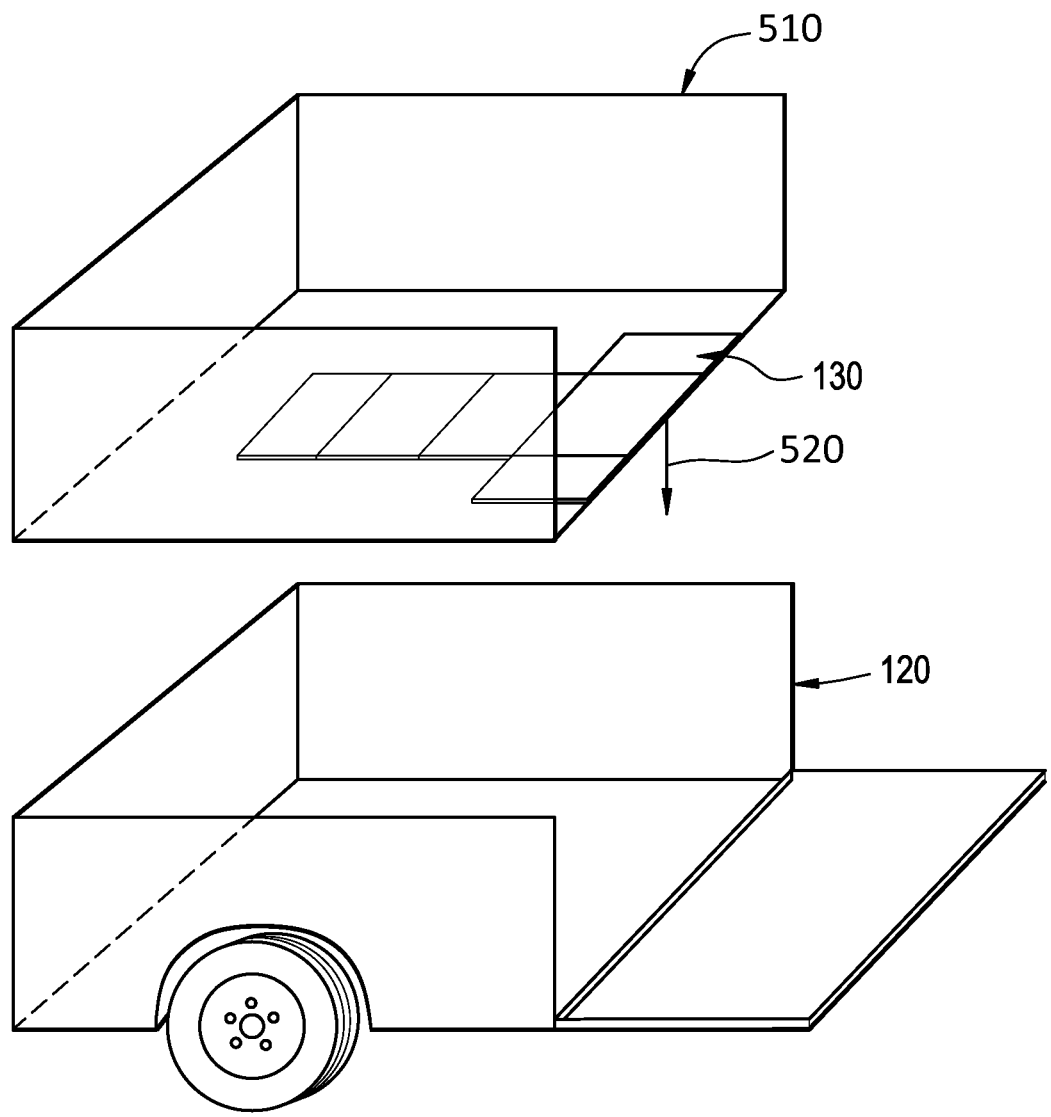
FIGS. 5A-5E illustrate examples of a collapsible storage container in a bedliner.
Figure 5B:
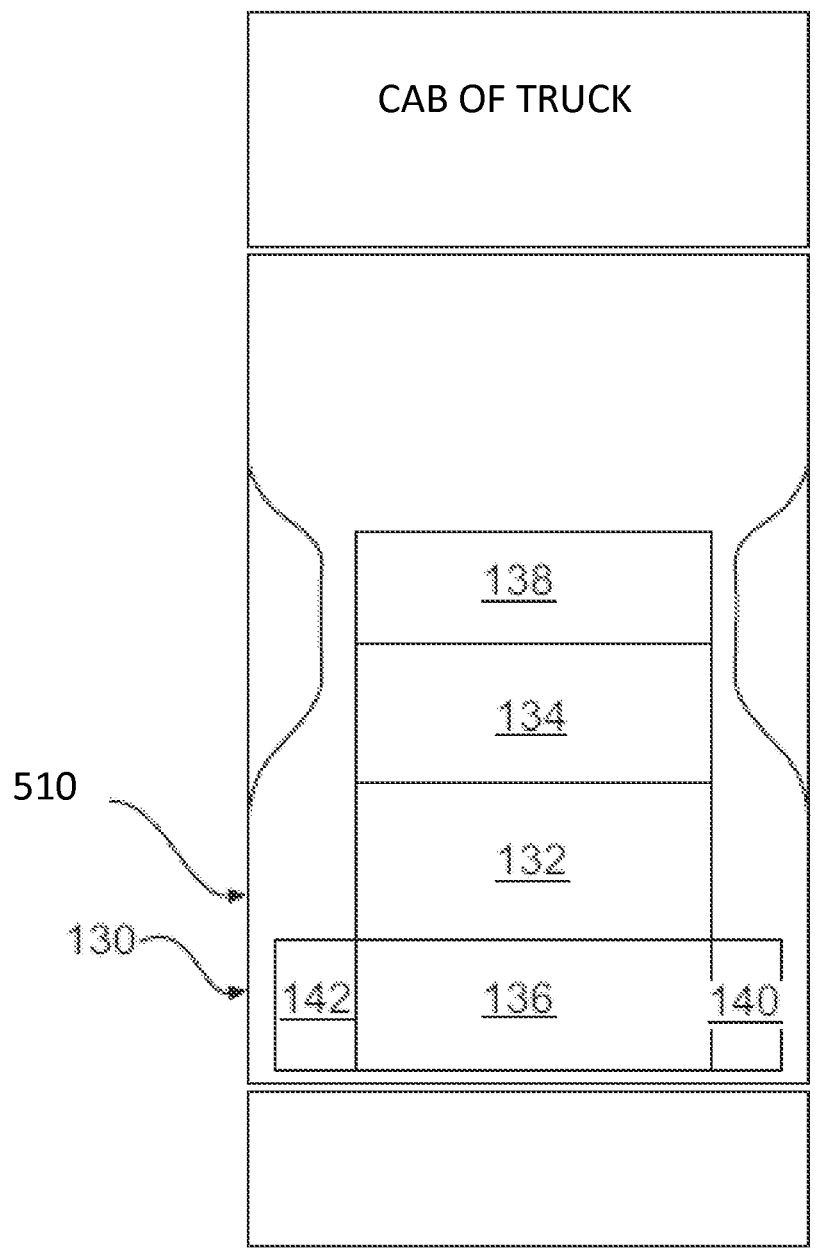

In some embodiments, as shown in FIGS. 5A-5B, a collapsible storage container 130 is embedded in a bed liner 510. Embedded may include manufactured with (e.g., as a single piece), integrated with, built into, or otherwise formed with the bed liner 510. For example, during manufacture of a bed liner, one, some, or all of the panels of a collapsible storage container may be manufactured into the bed liner to allow for the use of a collapsible storage container when the bed liner is installed in the bed of a truck. The collapsible storage container, when manufactured as a single piece with the bed liner may not be removed from the bed liner. For example, during manufacture, a single injection molding process may be used to form both the bed liner and the collapsible storage container.

FIG. 5A illustrates a collapsible storage container 130 embedded in a bed liner 510 that has not been installed in the bed of the truck. The arrow 520 illustrates that the bed liner 510 may be installed in the bed 120 of the truck. Once the bed liner 510 is installed in the bed 120, the collapsible storage container 130 may be collapsed and uncollapsed. The collapsible storage container 130, when in a collapsed position, may be used as the bed liner 510. FIG. 5B illustrates the bed liner 510 installed in the bed 120 of the truck. The collapsible storage container 130 is collapsed. Accordingly, the interior walls of the collapsible storage container 130 may be used as part of the bed liner 510.

Figure 5C:
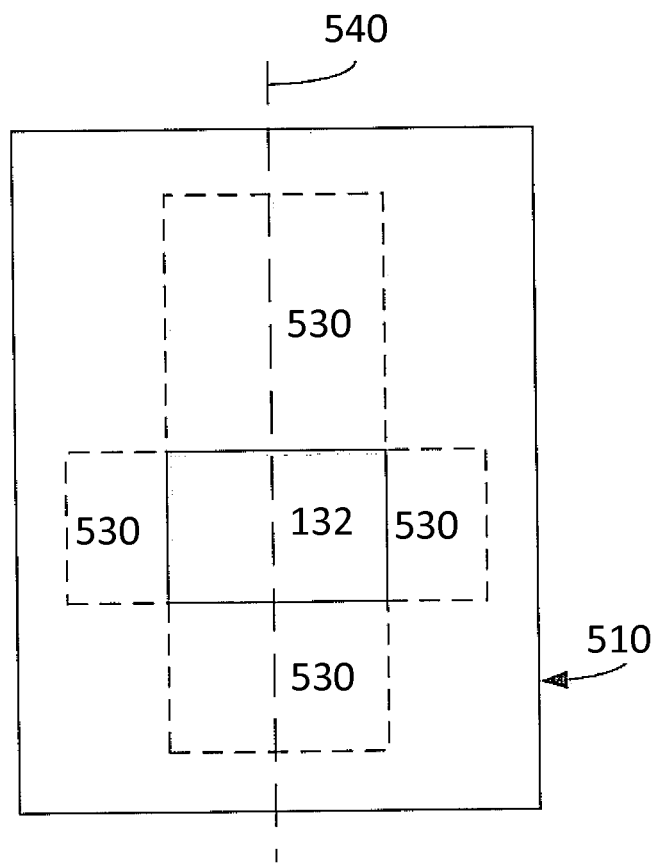
Figure 5D:
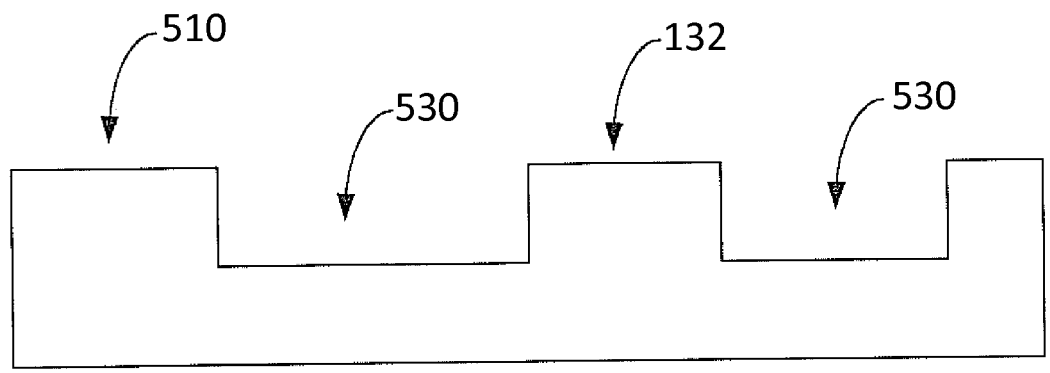

FIG. 5B illustrates a top view of a collapsible storage container 130 that is embedded in a bed liner 510. In this example, the base panel 132 is formed with the bed liner 510 during the manufacturing process. For example, as shown in FIG. 5C, the bed liner 510 may be formed with indentations 530 surrounding (e.g., adjacent to) the base panel 132, which is formed as part of the bed liner 510. FIG. 5D illustrates a side view of cross section 540 (from FIG. 5C) of the bed liner 510. As shown in FIG. 5D, the base panel 132 is formed as part of the bed liner 510. One or more of the other panels (e.g., 134-142) may be formed with the base panel 132. Otherwise, they may be connected after manufacture, for example, using hinges.

Figure 5E:
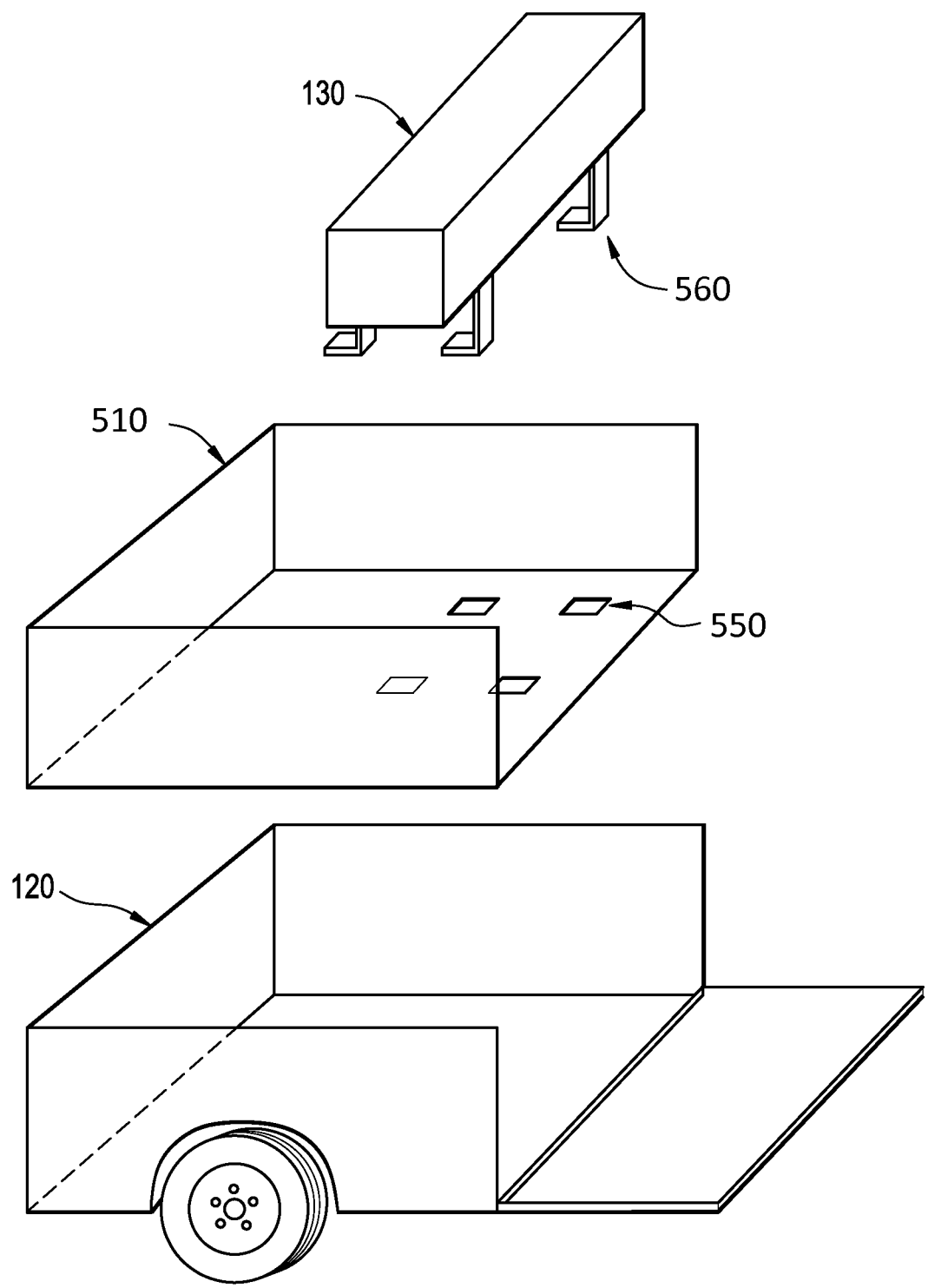

FIG. 5E illustrates another example of a bedliner 510. The bedliner 510 may be manufactured to receive a collapsible storage container 130. For example, when manufactured, the bedliner 510 may be formed to include reception slots 550. The reception slots 550 may be sized and configured to receive one or more connection devices 560 on the collapsible storage container 130. For example, prior to or after the bedliner 510 is connected to the bed 120 of the truck, one or more connection devices 560 may be inserted into the reception slots 550. When inserted, the one or more connection devices 560 may lock into the reception slots. This may lock the collapsible storage container 130 into place and prevent the collapsible storage container 130 from moving around.

In an embodiment, the bedliner 510 may be manufactured with the indentations of FIGS. 5C and 5D; however, the bedliner 510 with the reception slots does not need to include the indentations. Depending on where the connection devices 560 are located on the collapsible storage container 130, the reception slots may be located in other places of the bedliner 510. For example, the reception slots may be located on the side walls of the bedliner 510.

FIG. 5E illustrates an example of a bedliner 510 that is configured to receive or connect to a collapsible storage container. Other mechanisms may be built into the bedliner to connect the bedliner to the collapsible storage container. For example, the sides of the bedliner may include indentations as the reception slots. The collapsible storage container 130 may include one or more spring loaded rod on the side of the collapsible storage container 130. The spring loaded rod may extend when placed inside the indentation of the bed liner.

In an embodiment, a collapsible storage container is attached to a bedliner, such as the bedliner 510, that is shaped to cover the bottom of the bed of a pickup truck. In an embodiment, the bedliner 510 matches the shape of the bottom of the truck bed including sides. In an embodiment, the bedliner 510 matches the shape of the bottom of the truck bed without sides.

Accessing the Interior of a Collapsible Storage Container

Figure 6A:
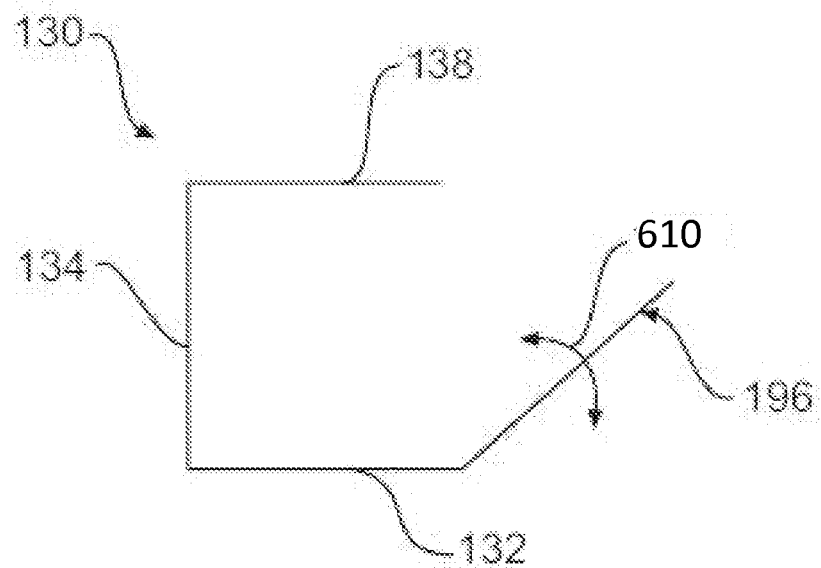
FIGS. 6A-6D illustrate various ways of accessing the inside or interior of a collapsible storage container.
Figure 6B:
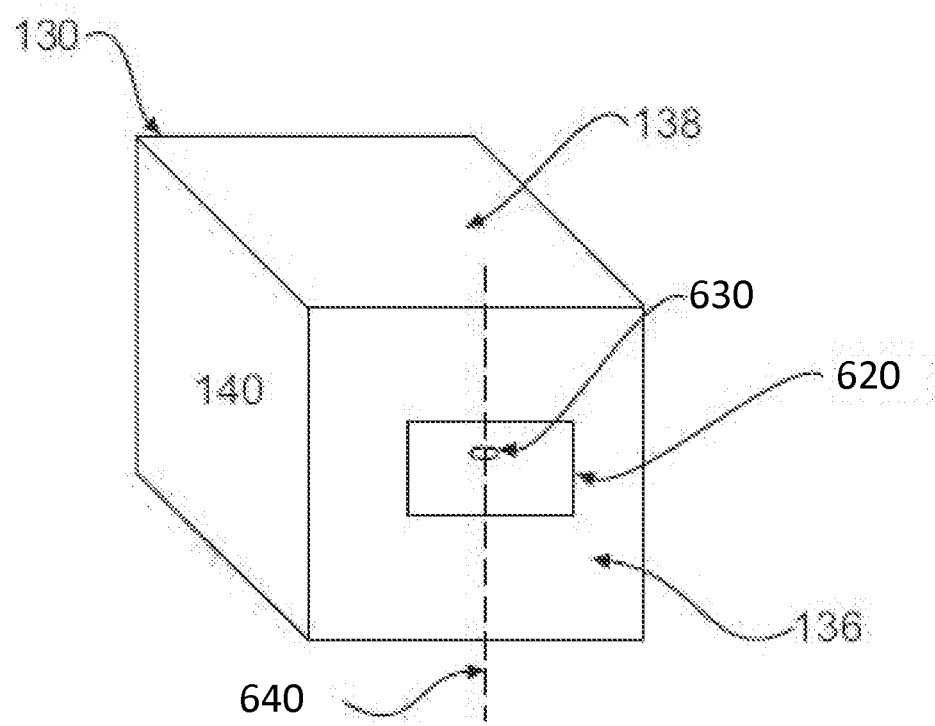
Figure 6C:
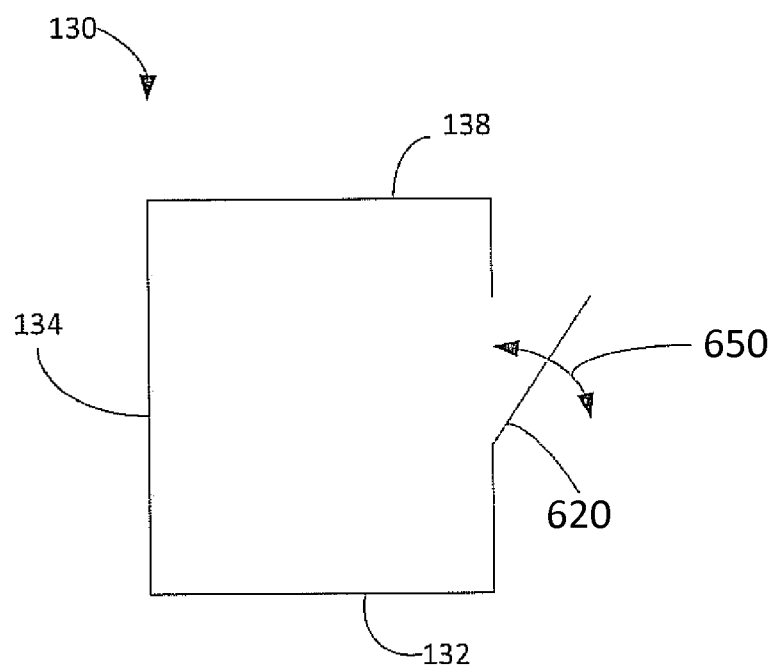
Figure 6D:
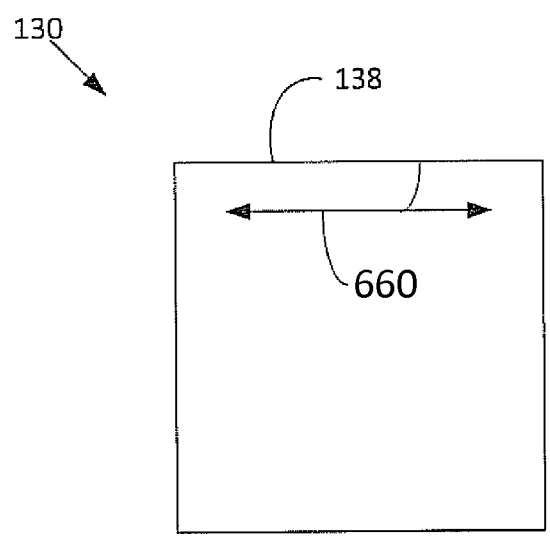

FIGS. 6A-6D illustrate various ways of accessing the inside or interior of a collapsible storage container 130. As shown in FIG. 6A, a connection system may allow the back panel 196 to open and close (shown by arrow 610) even though the other panels 132-134 and 138-142 remain in a fixed (e.g., uncollapsed) position. As shown in FIG. 6B, the back panel 196 may include a door 620 with a handle 630. As shown in FIG. 6C, the door 620 may open and close (shown by arrow 650). FIG. 6C illustrates a cross-section of the collapsible storage container 130 along the cross-section 640 of FIG. 6B. The handle 630 may allow the door 620 to latch shut. The door may be locked to prevent access to the interior. The lock may be unlocked, for example, using a key. In another embodiment, as shown in FIG. 6D, the top panel 138 may slide (shown by arrow 660). Sliding the top panel 138, for example, either to the left or right, may provide access to the inside or interior of the collapsible storage container 130. In some embodiments, the top panel 138 may slide in either direction. However, in some embodiments, the top panel 138 may only slide in one direction (e.g., either to the left or right).

In an embodiment, instead of or as alternative to one or more of the sides opening to provide access to the inside of the collapsible storage container 130, one or more of the sides may include a door or opening that provide access to the inside. For example, a door, which is smaller than a side of the collapsible storage container may be opened and closed to provide and prevent access to the inside of the collapsible storage container 130.

Additional Configuration and Collapsing Embodiments

Figure 7A:
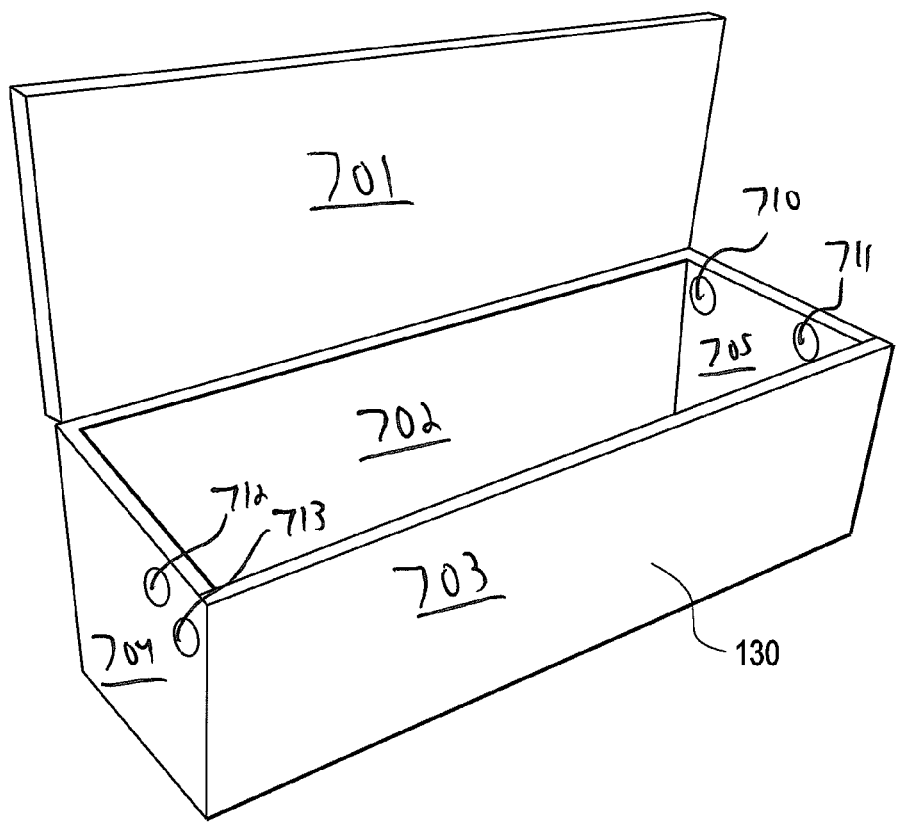
FIG. 7A illustrates an example fully erected storage container.
Figure 7B:
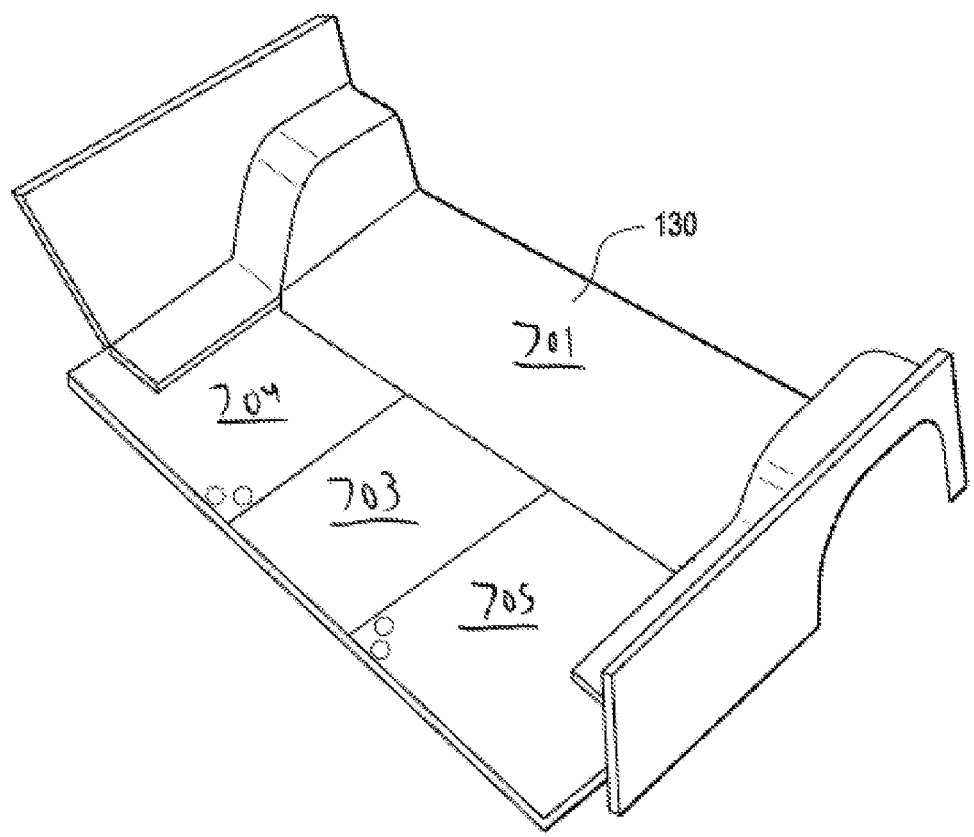
FIG. 7B illustrates an example container with top and sides collapsed.

FIGS. 7A-B illustrate an example fully erected storage container 130 (FIG. 7A) and the same example container 130 with top and sides collapsed (FIG. 7B). As illustrated in FIG. 7A, end panels 704, 705 are affixed to front and back panels 702, 703 using locks and/or other connectors 710, 711, 712, 713. A top panel or lid 701 is affixed to the panel 702 and is movable to be placed on top of the container 130 to enclose the interior of the container 130 in conjunction with the base and other panels 702, 703, 704, 705. As illustrated in the collapsed view of FIG. 7B, end panels 704, 705 can be folded on top of a base 703, and panel 701 can be folded over the other panel(s) (with a panel, not shown, positioned underneath the base 703). As illustrated in the example of FIG. 7B, the collapsible storage container 130 can be integrated into and/or attached to a partial or full bedliner.

Example Metal-Based Collapsible Container Configurations

Figure 8A:
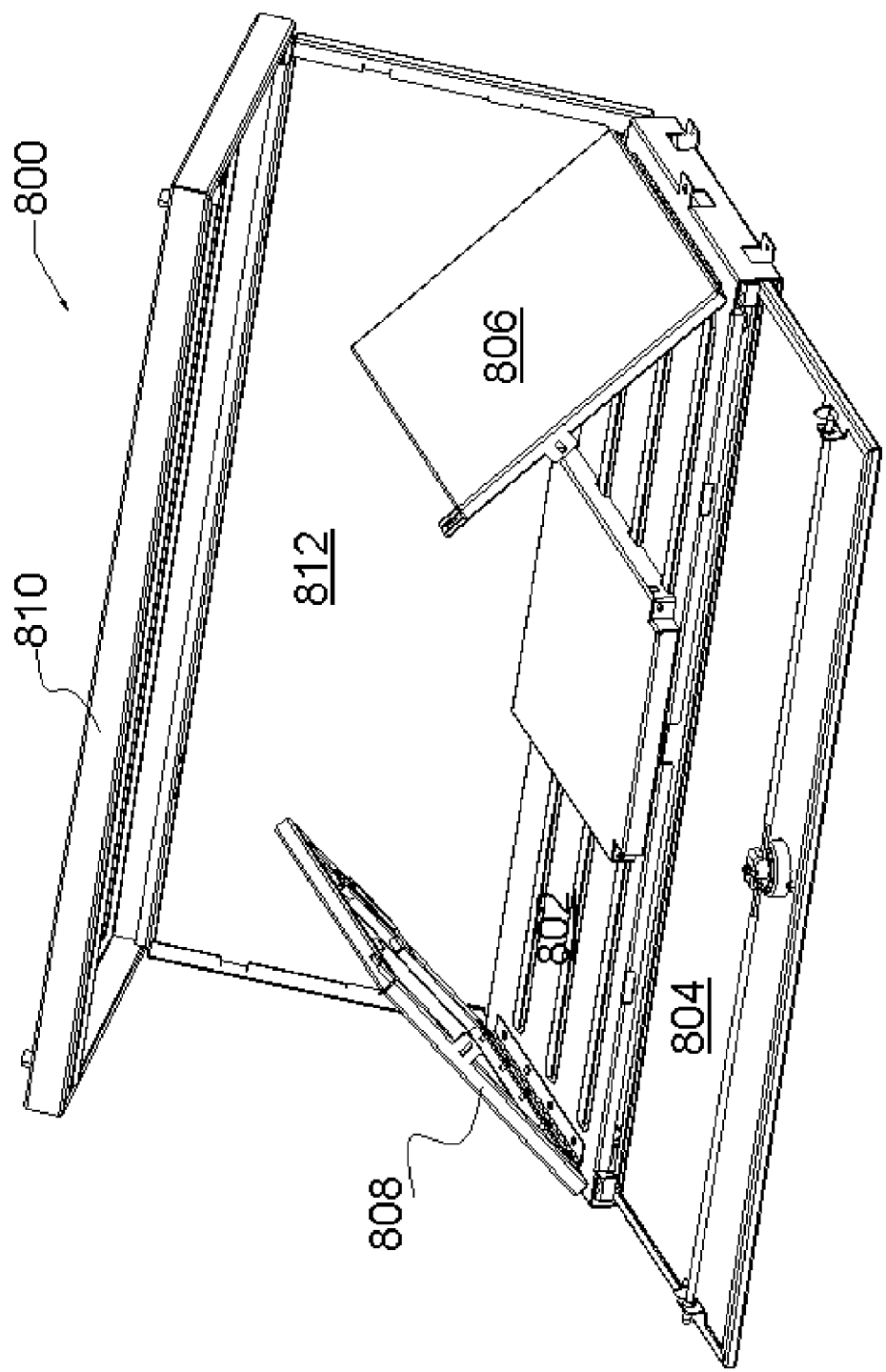
FIGS. 8A-D illustrate an example metal-based collapsible storage container.

FIGS. 8A-D illustrate an example metal-based collapsible storage container 800. For example, the collapsible storage container 800 can be constructed from aluminum and/or other metal and/or alloy-based material usable to provide support and durability to the collapsible storage container 800. FIG. 8A illustrates the example collapsible storage container 800 in a transitional position between collapsed and un-collapsed. As will be discussed further below, one or more of a circle cam disc, hook and ball, block and hinge, pin and groove, etc., can be implemented to maintain alignment, guidance, and connectivity between.

As illustrated in FIG. 8A, side panels 806, 808 are affixed to base panel 802. The side panels 806, 808 are movable between resting on top of the base panel 802 and an upright position. In the upright position, each side panel 806, 808 can be connected to the front panel 804 and a back panel 812. A top panel or lid 810 is affixed to the back panel 812 and is movable to be placed on top of the container 800 to enclose the interior of the container 800 in conjunction with the other panels 802, 804, 806, 808, 812. As illustrated in an example collapsed position view shown in FIG. 8D, end panels 806, 808 can be folded on top of the base 802, and the top panel 810 can be folded over the rear panel 812. The front panel 804 is positioned underneath (e.g., is slid under) the base panel 802.

Figure 8B:
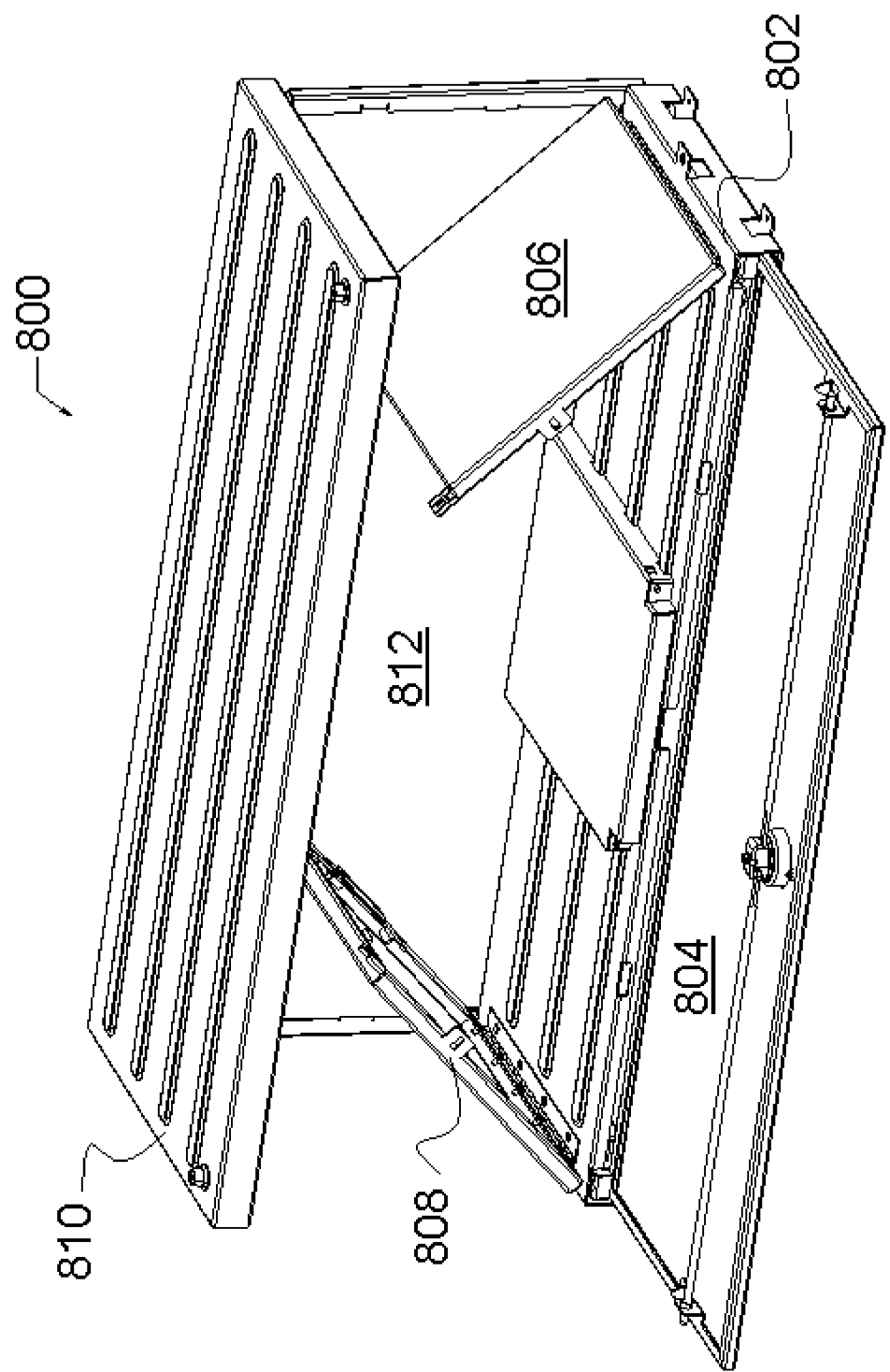

FIG. 8B shows the example collapsible storage container 800 in an intermediary position between a collapsed state and an uncollapsed state. As shown in the example of FIG. 8B, the back panel 812 supports the top panel 810, and the front panel 804 moves underneath the base panel 802. Side panels 806 and 808 move from a position against the base 802 to an erected position perpendicular to the top panel 810. Channels, guides, and/or slides 820, 822 provided in the base panel 802 guide the front panel 804 as the front panel 804 travels under the base panel 802, for example. Alternatively or in addition to the "pin and groove" guiding mechanism, one or more of a circle cam disc, hook and ball, block and hinge, etc., can be implemented to maintain alignment, guidance and connectivity between the front panel and the base.

Figure 8C:
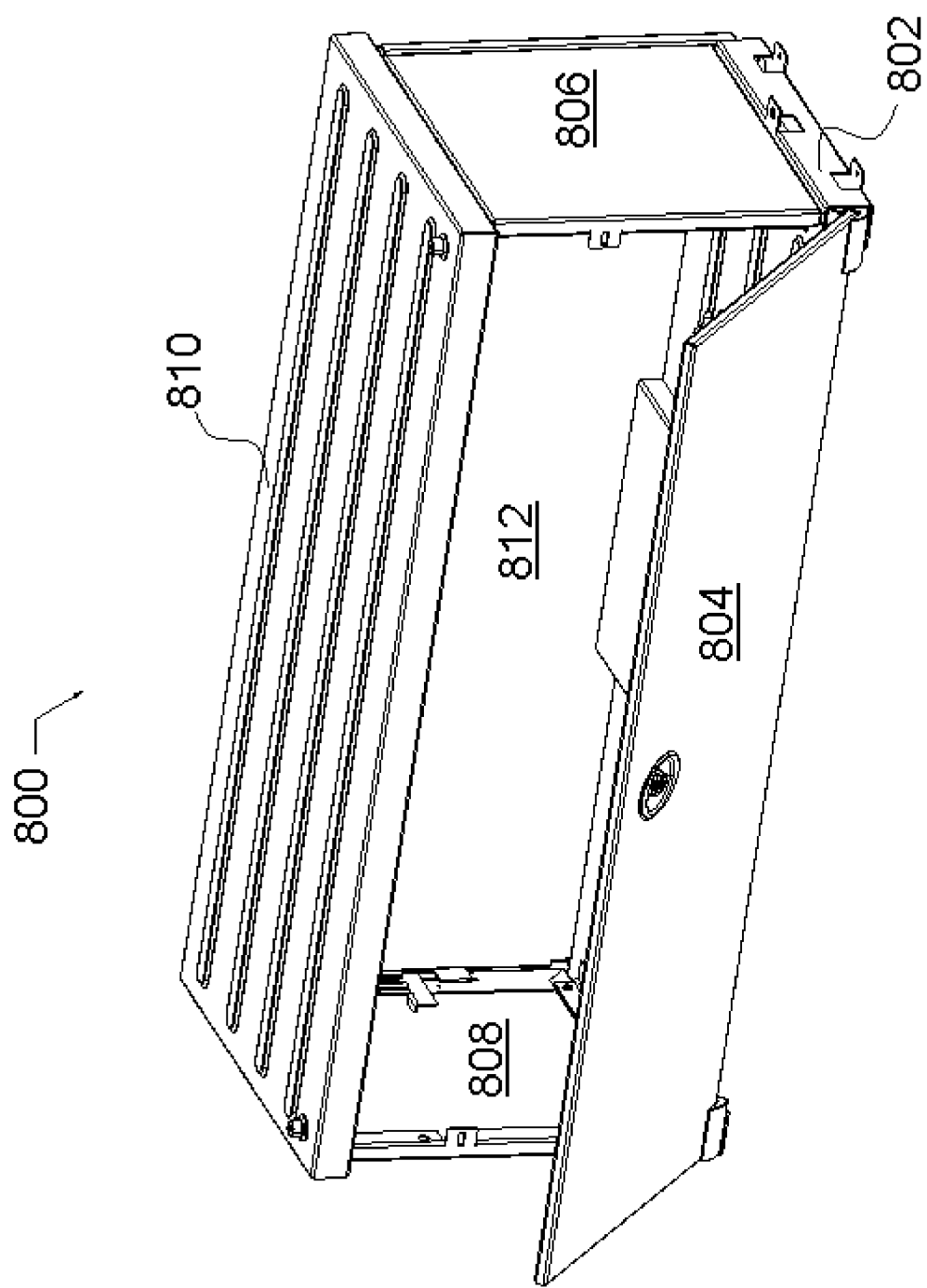

FIG. 8C shows the example collapsible storage container 800 with the top panel 810 latched down to the side panels 806, 808. In the example of FIG. 8C, the front panel 804 is raised to meet the top and side panels 806, 808, 810. The example container 800 latches and/or otherwise connects at a plurality of points 830-836 using one or more knobs, levers, latches, etc. The engaged panels can thereby be secured and will not move or flap around until unlocked.

In certain examples, a bottom covers the base panel 802 and the front panel 804 when the front panel 804 is slid under the base panel 802. Thus, the container 800 can be installed in the bed of a truck or trailer or other vehicle and withstand weather. For example, a box 800 installed in the bed of a pickup truck may be exposed to weather and/or other environmental elements such as rain, snow, sleet, hail, dirt, debris, etc., which can be very invasive. Without a bottom, these elements can become lodged underneath the container and have the potential, without a bottom or other covering, to render the unit inoperable.

Figure 8D:
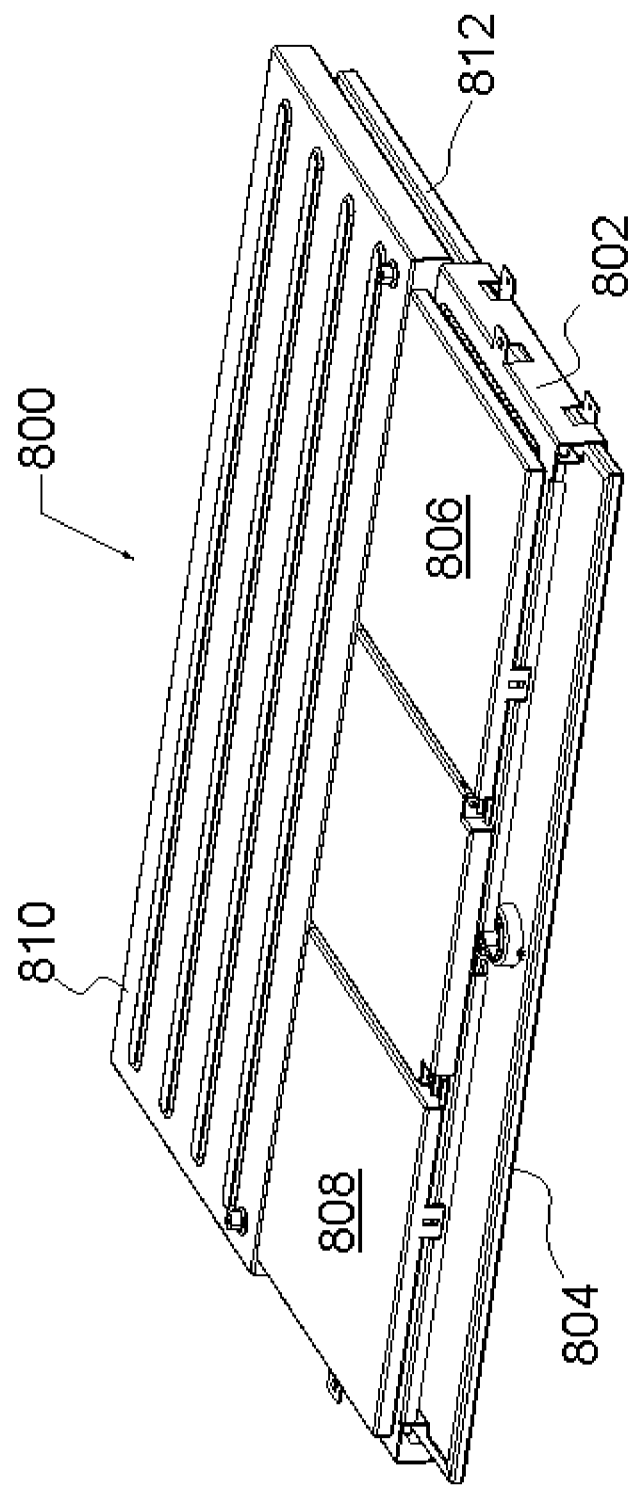

In certain examples, one or more handles can be provided to allow a user to manipulate the container 800 to carry the container 800 and/or maneuver the container 800 into and out of an erected state and a collapsed state (collapsed is shown in FIG. 8D). Further, each panel can include a handle or handhold to help provide better ease of use to a user manipulating the container 800. The knobs/levers/latches/or the like help to secure the side panels 806, 808 to one or more other panels 802, 804, 810, 812 depending upon whether the container 800 is collapsed or uncollapsed, for example. In certain examples, the container 800 can include a lock to secure portion(s) of the container 800 while erected and/or collapsed. In certain examples, handle(s), knob(s), latch(es), etc., can also be used to aid a user in tying down and/or otherwise securing the container 800 to the vehicle.

In certain examples, the container 800 provides a non-invasive attachment mechanism by which the weight of the container 800 itself (alone or in conjunction with a ballast) is sufficient to hold the container 800 in position without having to attach the container to a vehicle using an external device such as screws, latches, ties, etc. Alternatively or in addition, the bottom panel 802 can include one or more holes, notches, and/or other recessions to accommodate hooks, latches, knobs, and/or other protrusions to keep the container 800 from moving on the vehicle bed, for example.

In certain examples, when the collapsible box 800 is in transition between its collapsed and non-collapsed positions, there will be a time when one or more panels will have to be held in a certain position to receive the corresponding panel as they are brought together. For example, most containers have at least five sides which move: front, top, back, and two sidewalls. Since a person only has two hands, it is difficult to raise and connect all of the sides at the same time. Instead, certain examples of the container 800 include "stays" incorporated into a contour of the base 802, which hold the two sidewall panels 806, 808 of the collapsible container 800 in a desired position when the corresponding back 812 and top 810 are brought to them to be connected.

In other examples, latches, such as slam latches, are used instead of stays to provide connection of sides of the example container 800. Using a slam latch, two or more panels 802, 804, 806, 808, 810, 812 are connected by being "slammed" (e.g., gently or vigorously) into each other, at which point the slam latch catches to hold the panels in place. For example, side panels 806, 808 are raised, and the back panel 812 is pulled up and into the side panels 806, 808. The back panel 812 slams into place and is removably secure against the side panels 806, 808. Other examples of latching, locking, securing, etc., mechanisms include twist cams, push locks, etc.

In certain examples, the side panels 806, 808 are designed with a tongue and groove shape that has a dual purpose. A first purpose is to incorporate a "tortuous path" for incoming water or moisture that would get through any gap or crack remaining when two panels are connected. A second function of the tongue and groove is that their design (e.g., tapered) allows panels that are in the process of being connected to "index" at a point at which the panels first touch and then stay in alignment as the panels are continued to be brought together. Using a slight taper (e.g., wider at the bottom and narrower at the top), as the panels come together, misalignment can be accommodated by the tapered tongue and groove.

In certain examples, the side panels 806, 808 are designed with a cavity near the top of the inside surface of each panel in which a pipe, rod, or other ridged device can be inserted. When inserted, the pipe and/or other device provides a continuous connection across the container 800 (e.g., from side panel 806 to side panel 808). The pipe and/or other device then functions like a closet rod, allowing a user to strap or hang personal items on the rod for transport inside the container 800.

In certain examples, a series of hooks can be attached to the pipe, rod, and/or other ridged device to allow sacks to hang from the hook without having to be strapped or tied to the pipe. A user can place a sack over a hook, and the sack can then swing freely rather than spilling and allowing items to roll around in the container 800.

In certain examples, the example container 800 includes one or more hinges connecting the end pieces 806, 808 to the base 802. The hinges can be implemented as metal hinges, rubber hinges, living hinges formed with the connected panels, double pivot hinges, etc.

In certain examples, one or more hinges can be used to facilitate movement of the front panel 804 with respect to the base 802. As previously described, the front panel 804 can slide under and/or into the base 802 for ease of storage. For example, by sliding the front panel 804 underneath and/or into the base 802, the container 800 can be placed at or near the tailgate of a truck without worrying about the front panel 804 extending unsupported beyond the bed or tailgate of the truck (e.g., hanging in mid-air).

Thus, as demonstrated in the example of FIGS. 8A-D, the container 800 can be formed from six solid panels. No "frame" is necessary to hold the panels, and no panel "segments" are necessary to keep the side panels straight. Rather than disconnecting panels to collapse the container 800, the front panel slides under the base of the box and the remaining panels fold down on top. The tongue and groove, circle cam disc, hook and ball, block and hinge, etc., on the panels aligns the panels with each other. Because the side panels are formed from a metal and/or other hard material, the unit 800 can be locked (e.g., in collapsed, partially collapsed, and/or erected configurations, etc.). In certain examples, the side panels can be locked and the front panel can be opened.

FIG. 8D shows the example collapsible storage container 800 in a fully collapsed position. In the fully collapsed position, side panels 806, 808 lay flat on top of the base panel 802. The top panel 810 folds on top of the back panel 812 and lays next to the base panel 802. The container 800 rests on a vehicle bed when fully collapsed, partially collapsed, fully uncollapsed/erected, etc. The container 800 can be operated with a vehicle tailgate up or down, and the vehicle tailgate can be opened even when the container 800 is full of cargo.

While certain examples utilize one or more trusses to provide support to the base of a collapsible storage container, other examples include a base that provides its own support and does not need additional support (e.g., because the base is constructed from a material, such as a metal, hard plastic, etc., that is constructed of material stiff enough to span from side to side without added support. In certain examples, the front panel 804 slides under the base 802 and remains in alignment with the base 802 in an opening between the base panel 802 and a container bottom without use of a guide member.

In certain examples, the top 810 of the box 800 can be secured while allowing the front panel 804 to open and close independently of the top panel 810. Additionally, the front 804 of the box 800 can be secured while the top panel 810 is opened and closed. In certain examples, one or both of the sides 806, 808 is movable while the top 810, front 804, and back 812 are secured.

In certain examples, the container 800 collapses by folding the back panel 812 away from the base 802. The two side panels 806, 808 fold toward each other to lay side by side. Since none of the panels, except for the top 810/back 812 combination, lay on top of each other, the inside of all of the panels 802, 804, 806, 808, 810, 812 remains protected when in the collapsed position. Thus, when mud or dirt get splattered on the outside of a panel 802, 804, 806, 808, 810, 812 when the panel is in an erected position and the panel is then folded, the muddy/dirty side of the panel 802, 804, 806, 808, 810, 812 does not transfer this dirt/mud/etc. to its neighbor in the collapsed position.

In certain examples, the front panel 804 spans an entire length of a gap between the side panels 806, 808. Stiffness of the material from which the front panel 804 is made (e.g., metal, hard plastic, etc.) provides support for the movable panel 804 without a slide member or other bridge element. In certain examples, one or more pins are formed on the bottom of the front panel 804 near a side panel 806, 808 to guide movement of the panel 804 from a front of the container 800 to under the base 802 of the container 800. The pins can slide in a slot that is closed on the end. The closed slot prevents the front panel 804 from being removed or dismounted from the container 800.

In certain examples, the top panel 810 is attached to the back panel 812 and is movable with respect to the back panel 812 (e.g., from a closed position "capping" the container 800 and touching the tops of the erected back 812, sides 806, 808 and front 804 to an open position raised from the back panel 812 to a collapsed position in which the top panel 810 rests on top of the back panel 812). The top 810 can be latched to the box 800 separately from the front 804, and the front 804 can be latched separately from the top 810. Thus, in certain examples, the front 804 can open while the top 810 is fixed and/or vice versa. In certain examples, when collapsed, while the top 810 rests on the back 812, the sides 806, 808 rest next to each other on the base 802, and the front panel 804 is slid underneath the base 802.

In certain examples, the back panel 812 collapses by folding away from the base 802, and the two side panels 806, 808 fold toward each other to lay side by side. None of these panels (except for the top/back combination) are ever laying on top of each other. Using this folding method, all of the insides of the panels 802, 804, 806, 808, 810, 812 are protected from the dirty (e.g., exposed to the weather) side of a corresponding panel 802, 804, 806, 808, 810, 812. In certain examples, the insides of the panels 802, 804, 806, 808, 810, 812 never touch the outside of another panel 802, 804, 806, 808, 810, 812 when in the collapsed position.

For example, if mud, dirt, grease, etc., is splattered on the outside of a panel 802, 804, 806, 808, 810, 812 when the panel is in an erected position, and the container 800 is then folded, the muddy/dirty side of the panel never gets to transfer this dirt to it's neighbor in the collapsed position. No inside panel surface ever contacts an outside panel surface in a collapsed or uncollapsed state.

As discussed above, certain examples provide a variety of devices to control the front panel 804 of the collapsible storage container 800 as the panel 804 slides out from under the base 802. The control(s) grab and constrain (e.g., stop, limit, etc.) the front panel 804 in position to swing vertically into place resting next to the erected side panels 806, 808 normal to the base 802. A variety of approaches can be used to align the front panel 804 with the side panels 806, 808 and the base 802 as well as keep the front panel 804 from inadvertently being pulled out of the cavity created between the base 802 and a bottom of the container 800. Several examples are disclosed and described below.

For example, one or more cam-shaped discs (e.g., circle cam discs, square cam discs, trapezoidal cam discs, etc.) and/or other object(s) having an offset center can be attached to the bottom of the front panel 804. The cam-shaped disc(s) and/or other object(s) can be attached near the end(s), side(s), and/or middle of the panel 804. A user can pull up on the front panel 804, and, based on the cam-shaped disc(s), the front panel 804 cannot come out of the box 800. Rather, the front panel 804 can only move up and down on a radius of the cam.

Figure 9A:
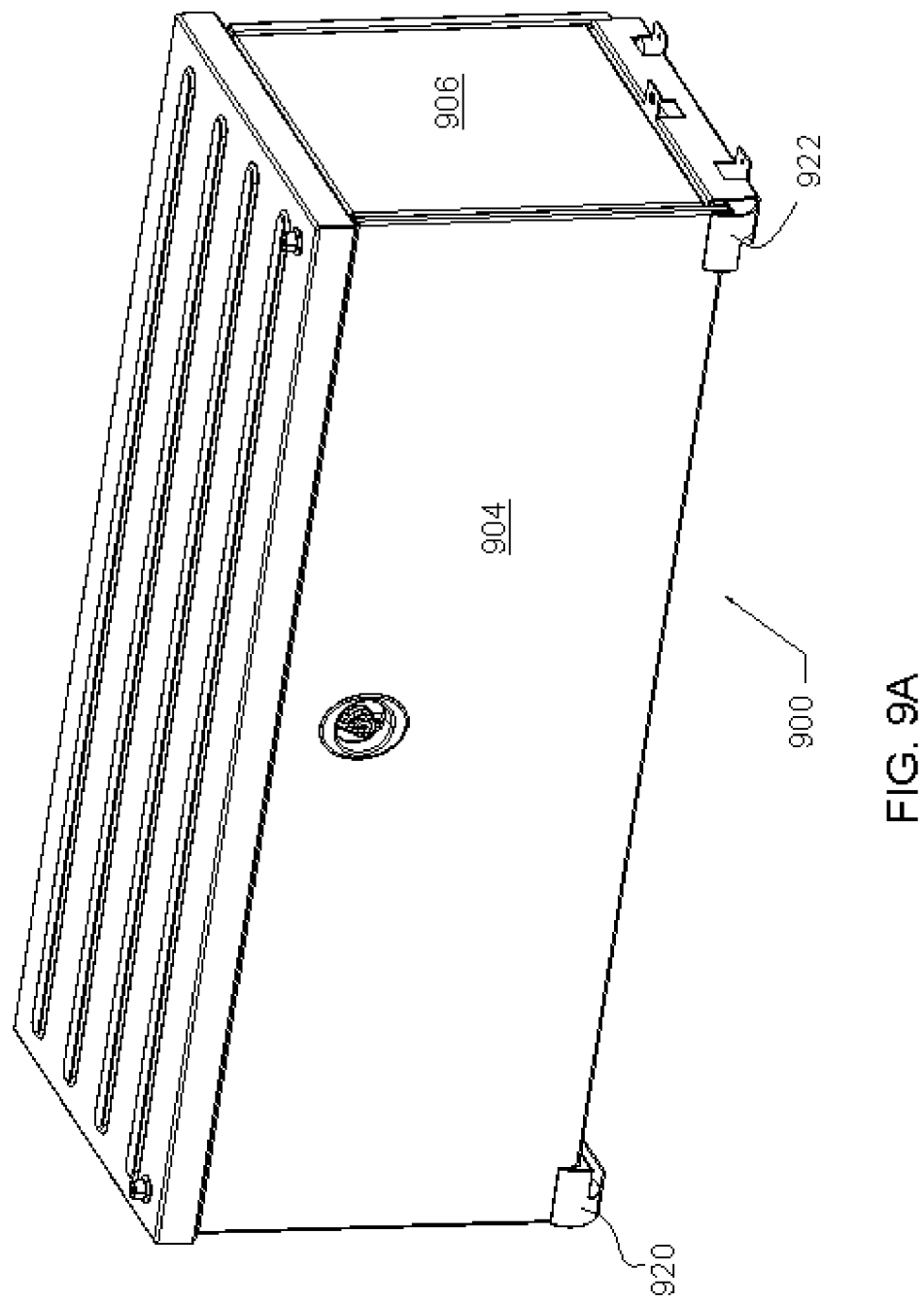
FIGS. 9A-D illustrate an example collapsible storage container including cam-shaped discs attached to a front panel.
Figure 9B:
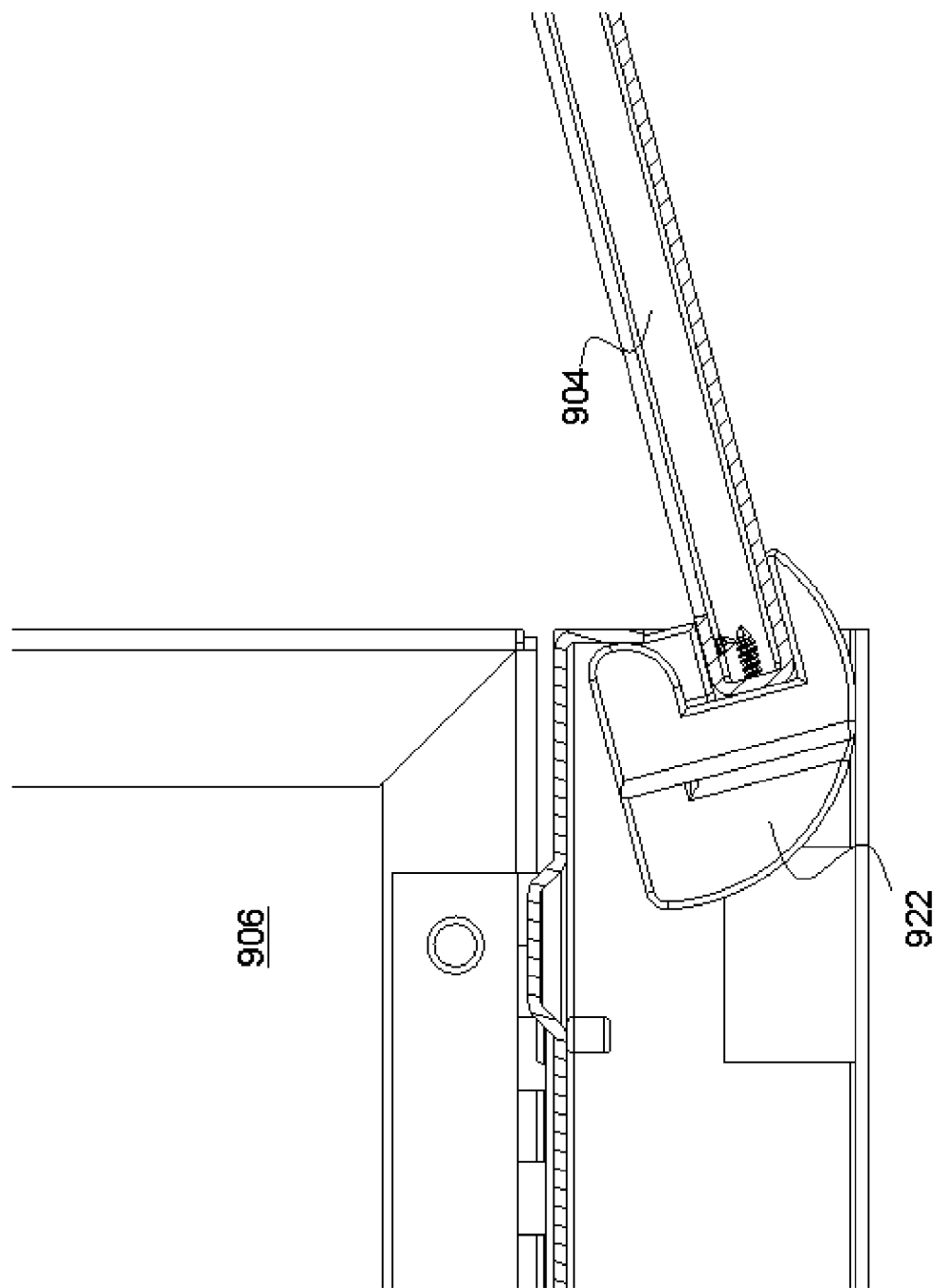
Figure 9C:
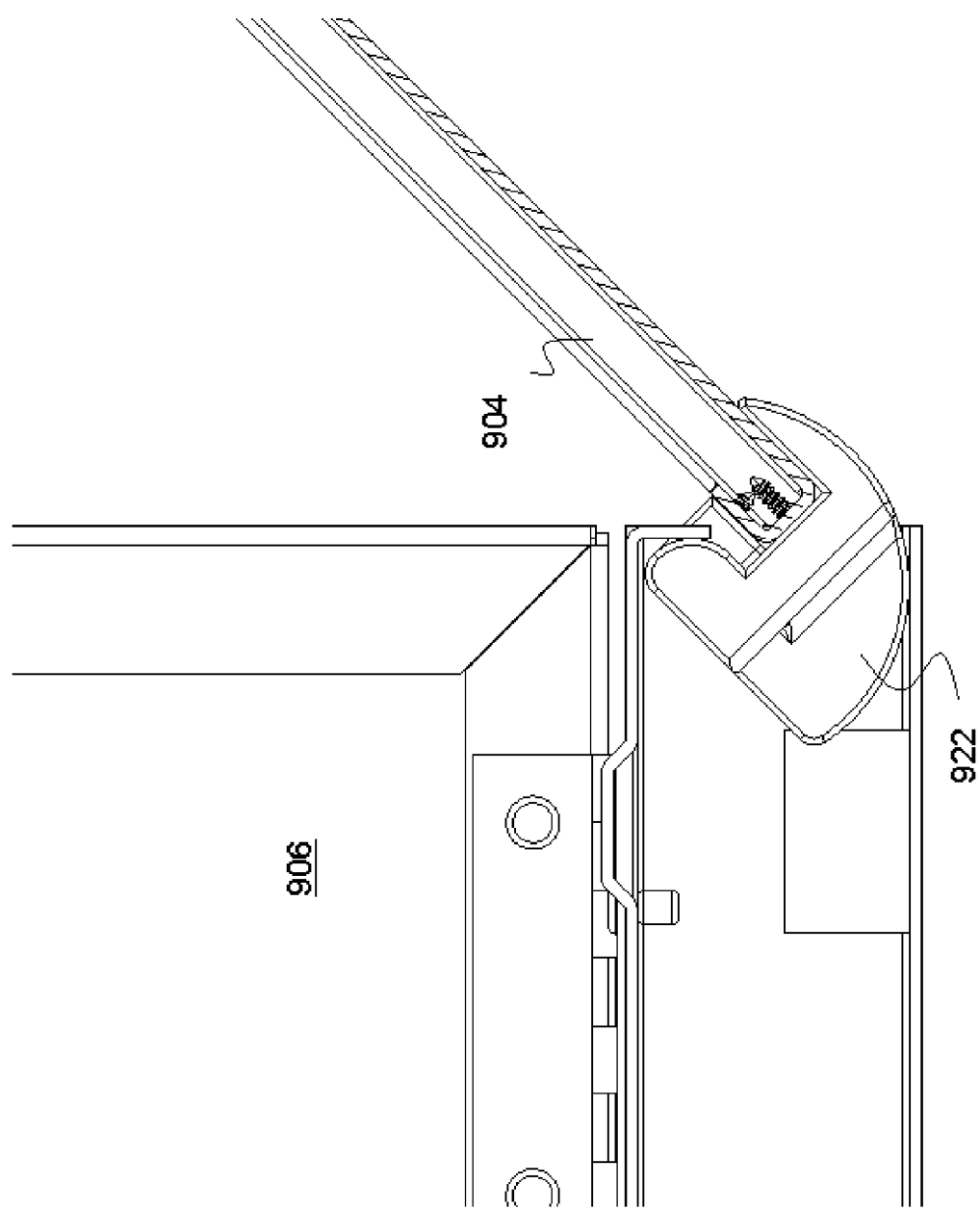
Figure 9D:
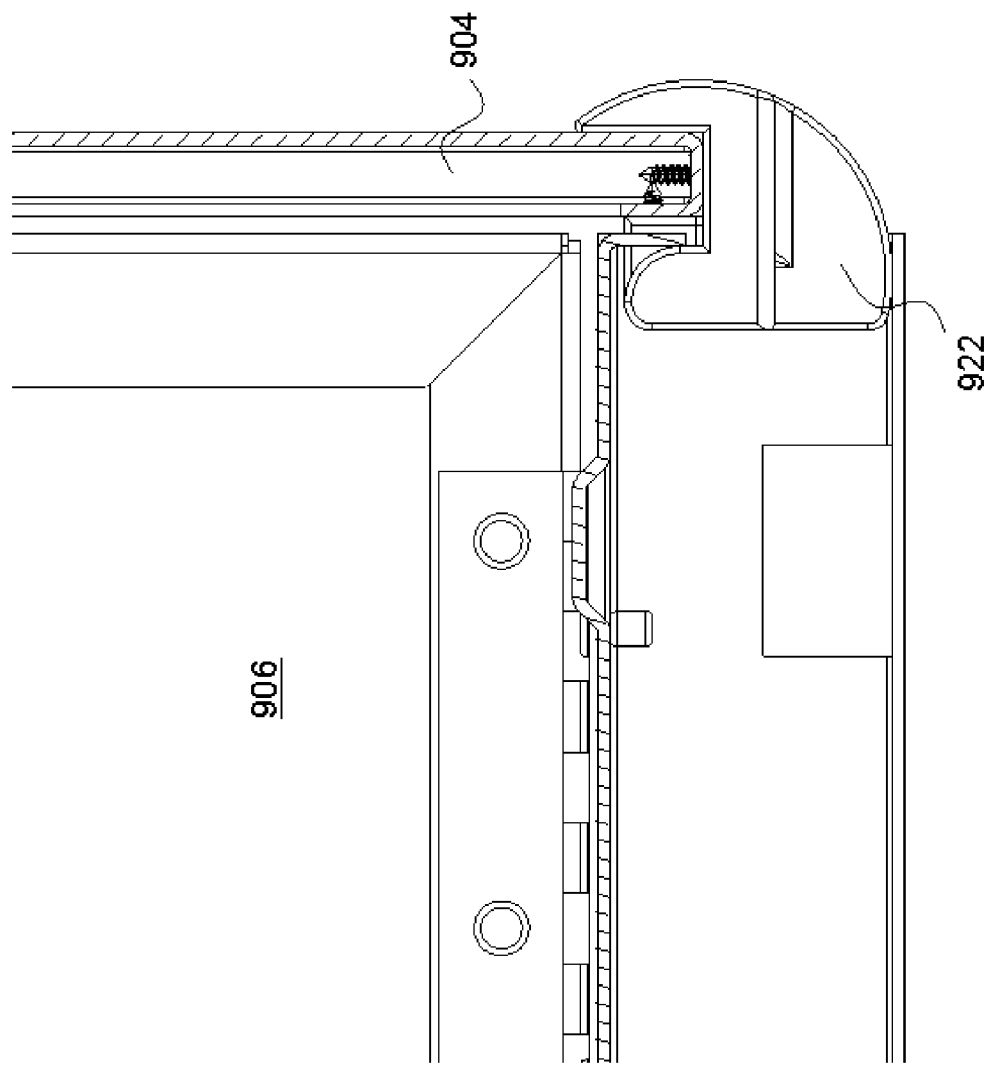

FIG. 9A illustrates an example CSC 900 in an erected position showing cam discs 920, 922 attached to a front panel 904. FIGS. 9B-C illustrate the example CSC 900 showing the cam disc 920 in two intermediate positions (e.g., between collapsed and erect). FIG. 9D shows the circle cam disc 920 when the front panel 904 is tight against side panels 906, 908.

Figure 10A:
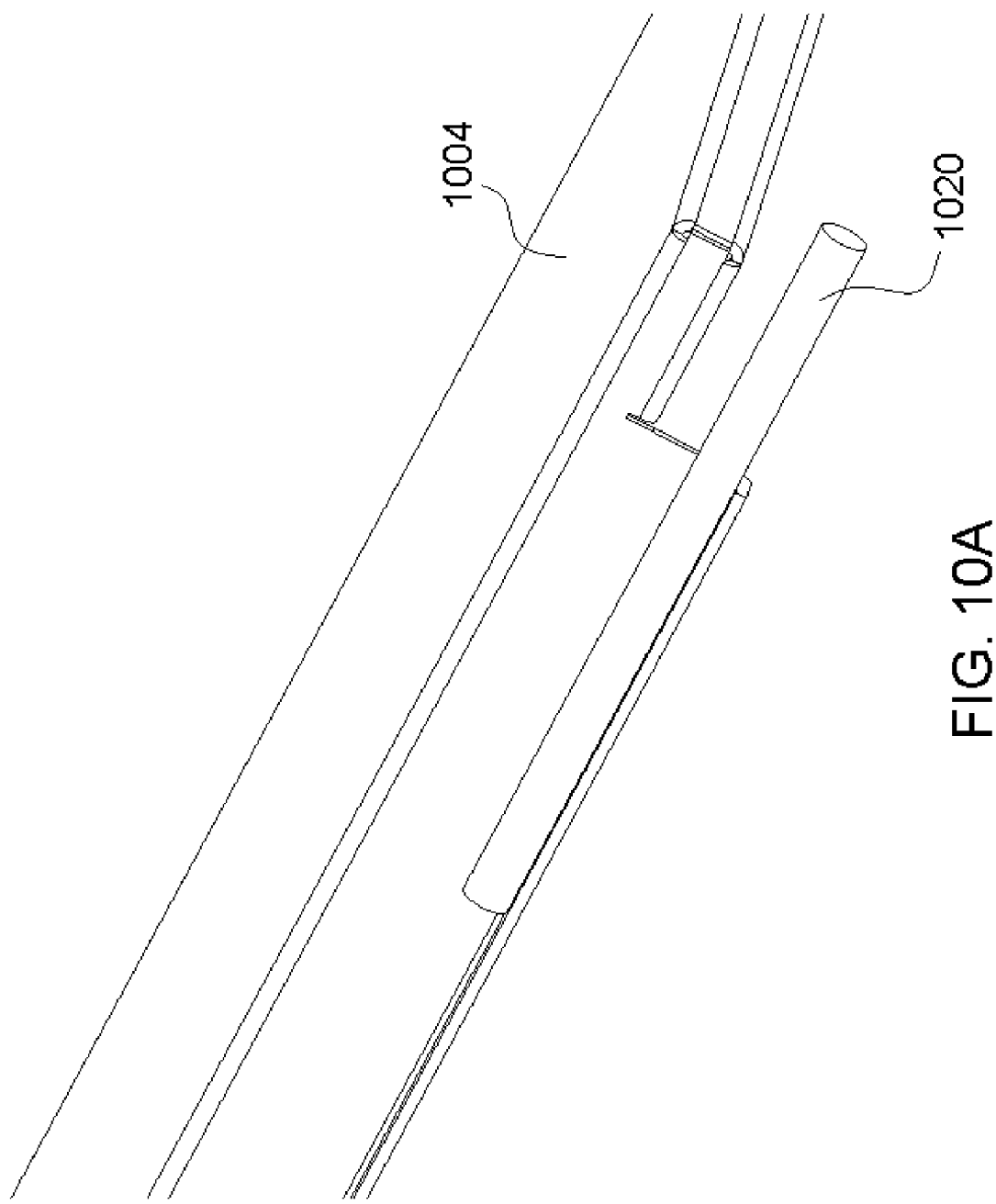
Figure 10B:
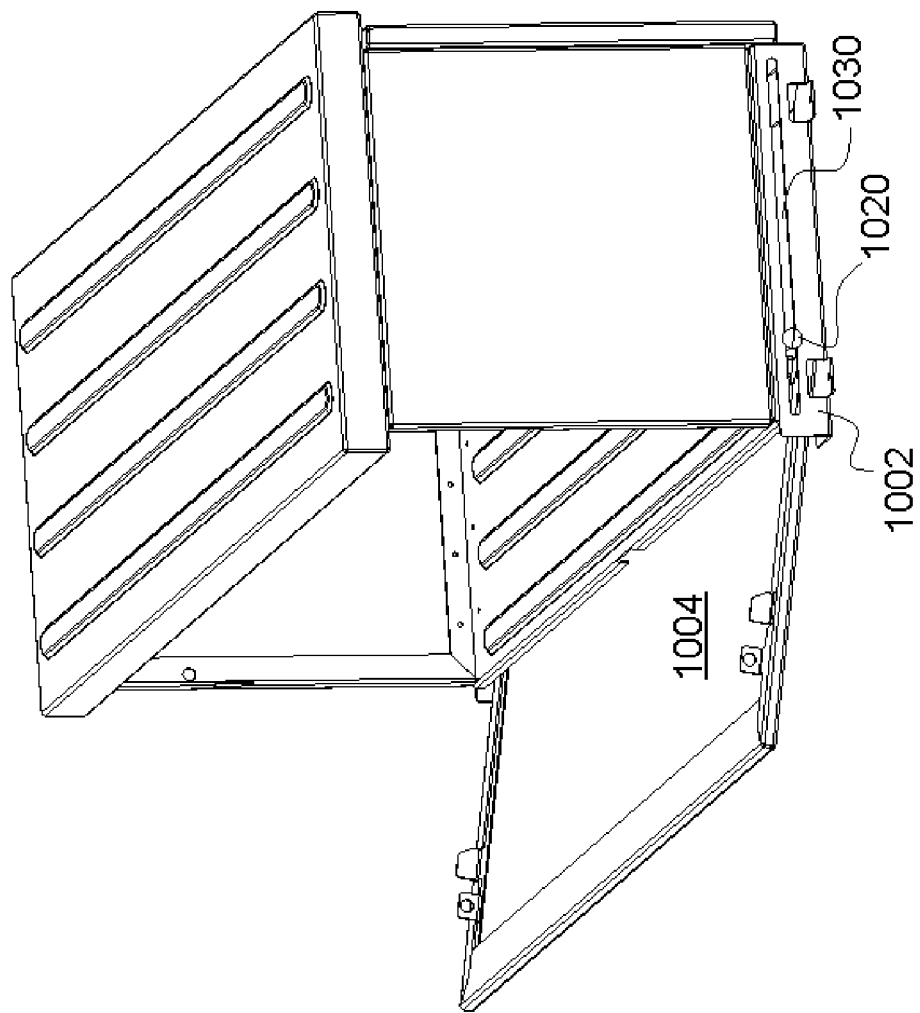

Alternatively or in addition to the cam-shaped disc implementation, certain examples use a "pin and groove" to secure and move the front panel. FIG. 10A shows a pin 1020 attached to a corner of a front panel 1004. As illustrated in FIG. 10B, the pin 1020 slides in a groove 1030 to move under and out from a base 1002. FIG. 10C shows the example pin 1020 position in the groove 1030 when the front panel 1004 is in a fully collapsed or withdrawn position underneath the base 1002. Thus, the groove 1030 allows the pin 1020 to move in the groove 1030 to keep the front panel 1004 in correct position, for example.

Figure 11:
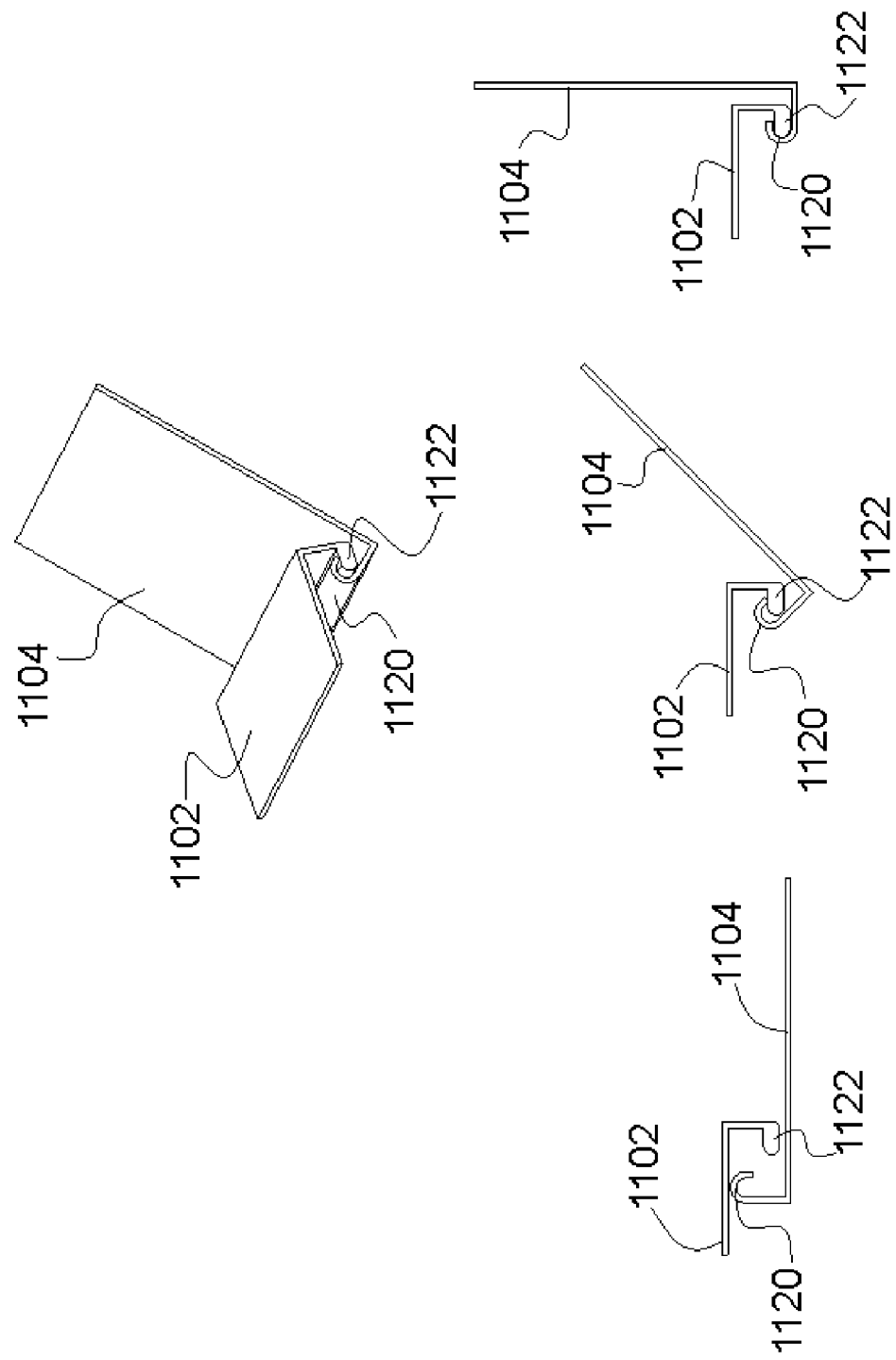
FIG. 11 illustrates an example hook and ball control device for movement of a panel with respect to a base in a collapsible storage container.

FIG. 11 illustrates another alternative example using a hook and ball for movement of a front panel 1104 with respect to a base 1102. As shown in the sequence of FIG. 11, a hook 1120 fits with respect to a ball 1122 and allows the front panel 1104 to pivot around the base panel 1102. In this way, the front panel 1104 can slide under the base 1102 until the hook 1120 connects with the ball 1122, at which point the front panel 1104 swings up until it locks normal to the base 1102.

Figure 12:
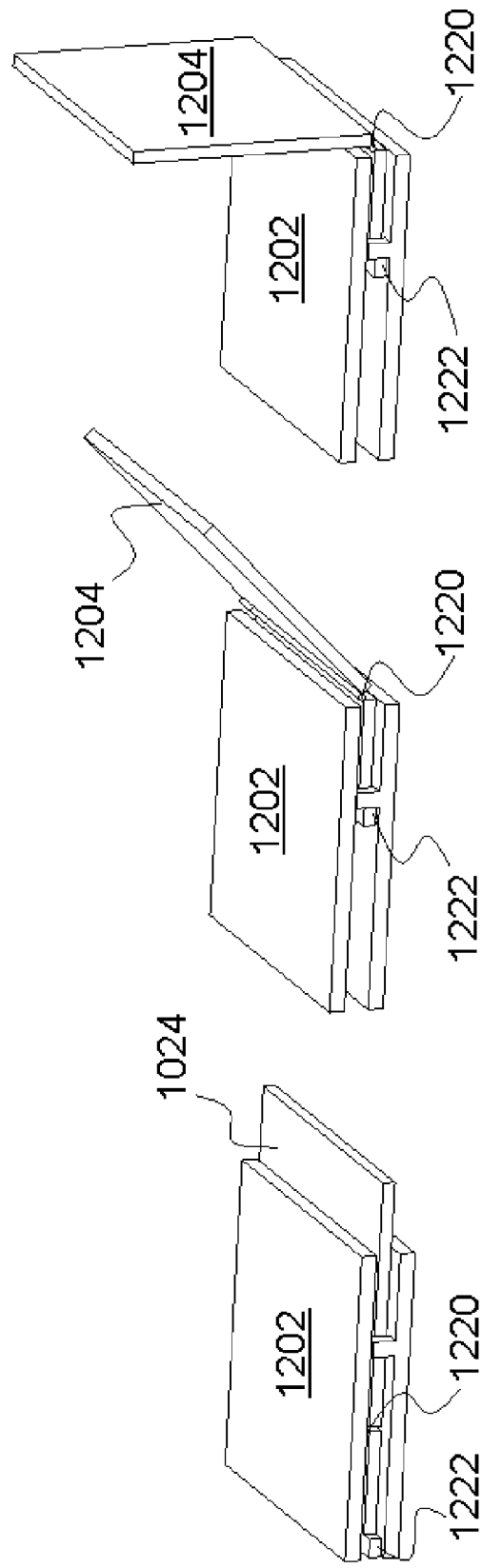
FIG. 12 illustrates an example block and hinge control device for movement of a panel with respect to a base in a collapsible storage container.

FIG. 12 illustrates another alternative example using a block and hinge for movement of a front panel 1204 with respect to a base 1202 of a collapsible storage container. A hinge 1220 allows the front panel 1204 to swing up with respect to the base 1202, and a block 1222 prevents the front panel 1204 from being pulled out of the base 1202. Using the hinge 1220, the front panel 1204 can be pulled up into an erected position normal to the base 1202, while the block 1222 stops the panel 1204 in position without moving the panel 1204 beyond position.

FIGS. 13A-D illustrate another example collapsible storage container 1300 facilitating movement and securing of panels using a plurality of cam-shaped discs 1320-1321. The discs 1320-1321 guide movement of a front panel 1304 with respect to a base 1302 and sides 1306, 1308. A back panel 1312 and top panel 1310 complete the example container 1300. A lock 1320 facilitates security and access control to an interior of the container 1300. One or more pads 1340-1341 protect the top panel 1310. In an example, one or more brackets 1350-1352 facilitate an optional mounting or securing of the container 1300 to an underlying surface (e.g., a vehicle bed, etc.).

Figure 13A:
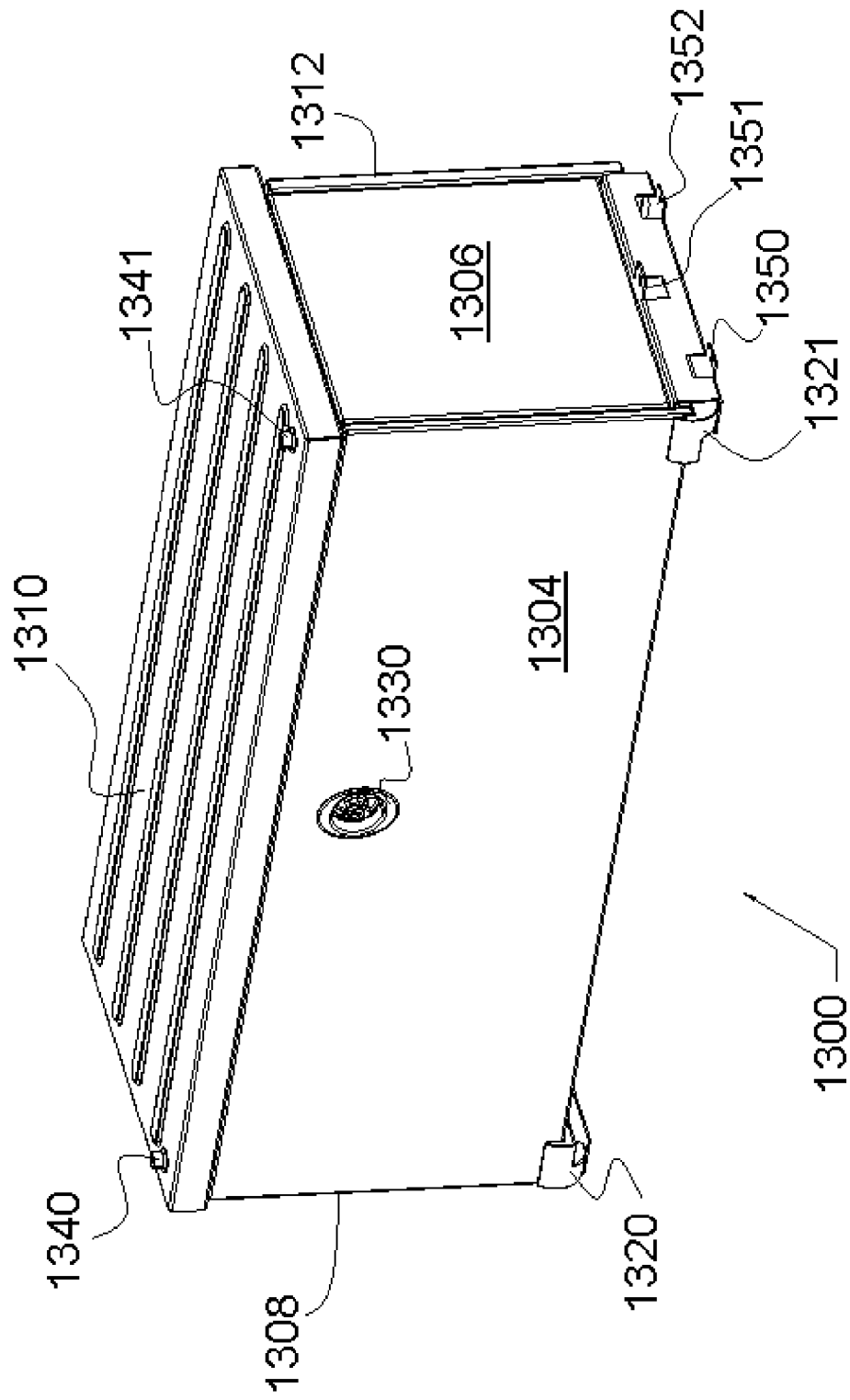
FIGS. 13A-D illustrate an example collapsible storage container facilitating movement and securing of panels using a plurality of cam-shaped discs.
Figure 13B:
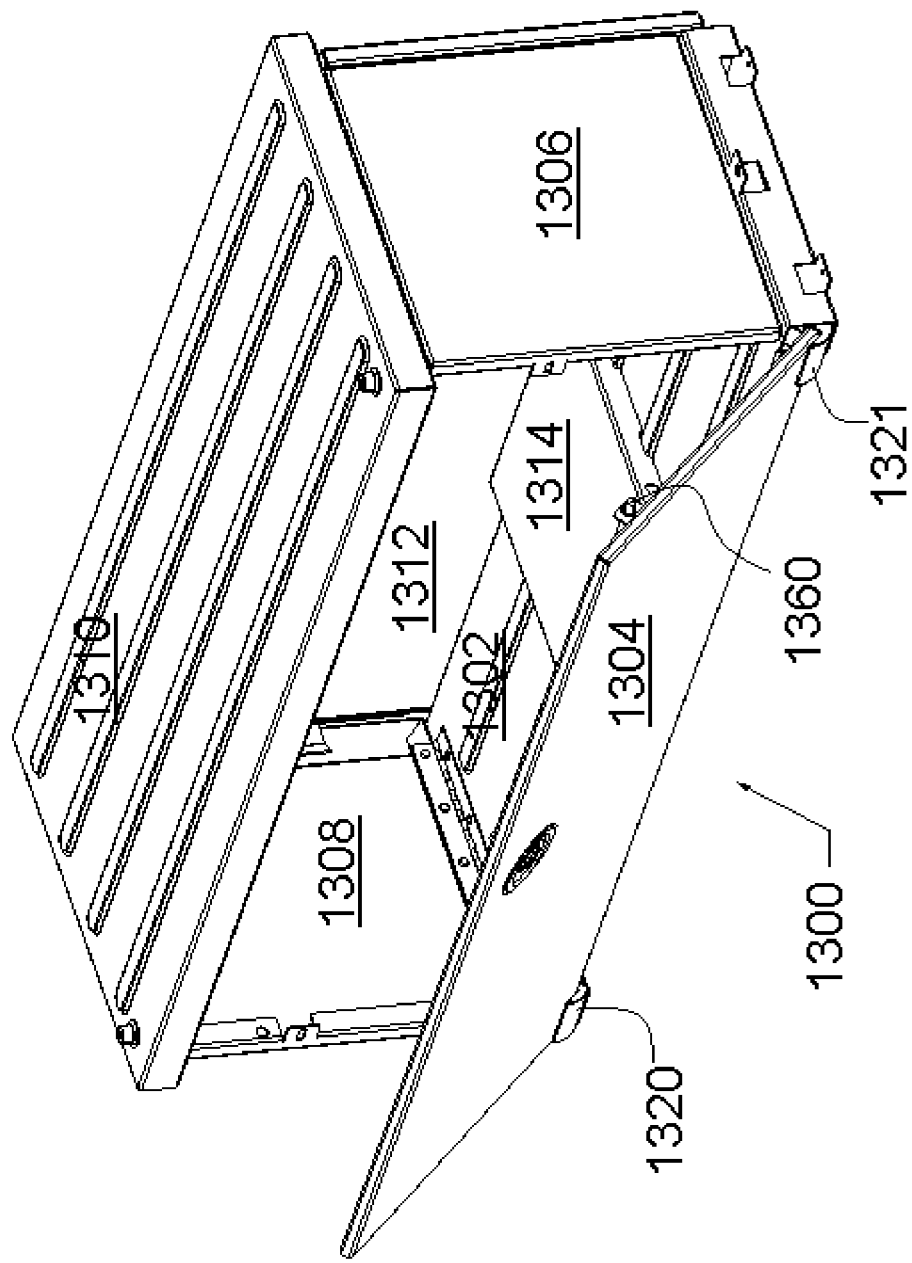

As demonstrated in the example of FIG. 13B, the front panel 1304 of the example container 1300 moves down, guided by the cam-shaped discs 1320-1321. As shown in the example of FIG. 13B, a latch 1360 removably holds the front panel 1304 in place until the panel 1304 is moved by a user.

Figure 13C:
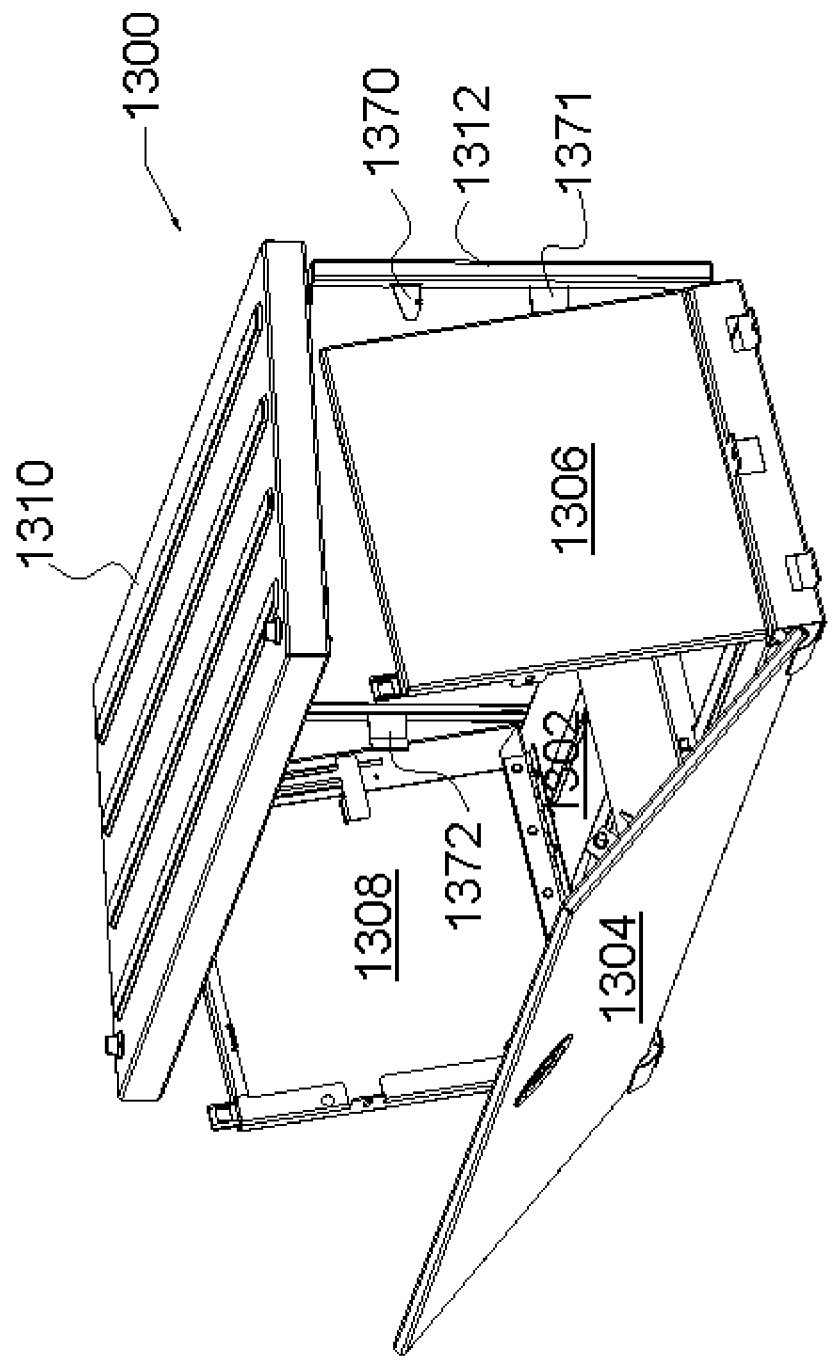

FIG. 13C illustrates a further partial state of the collapsible container 1300. As shown in the example of FIG. 13C, the back panel 1312 is movable away from the sides 1306, 1308 and base 1302. FIG. 13C shows an example intermediate position as the container 1300 is moved from an uncollapsed or erected position to a collapsed position. As shown in the example of FIG. 13C, one or more latches 1370-1372 removably hold the back panel 1312 in place against the side panels 1306, 1308 until the user moves the back 1312 away from the sides 1306, 1308.

Figure 13D:
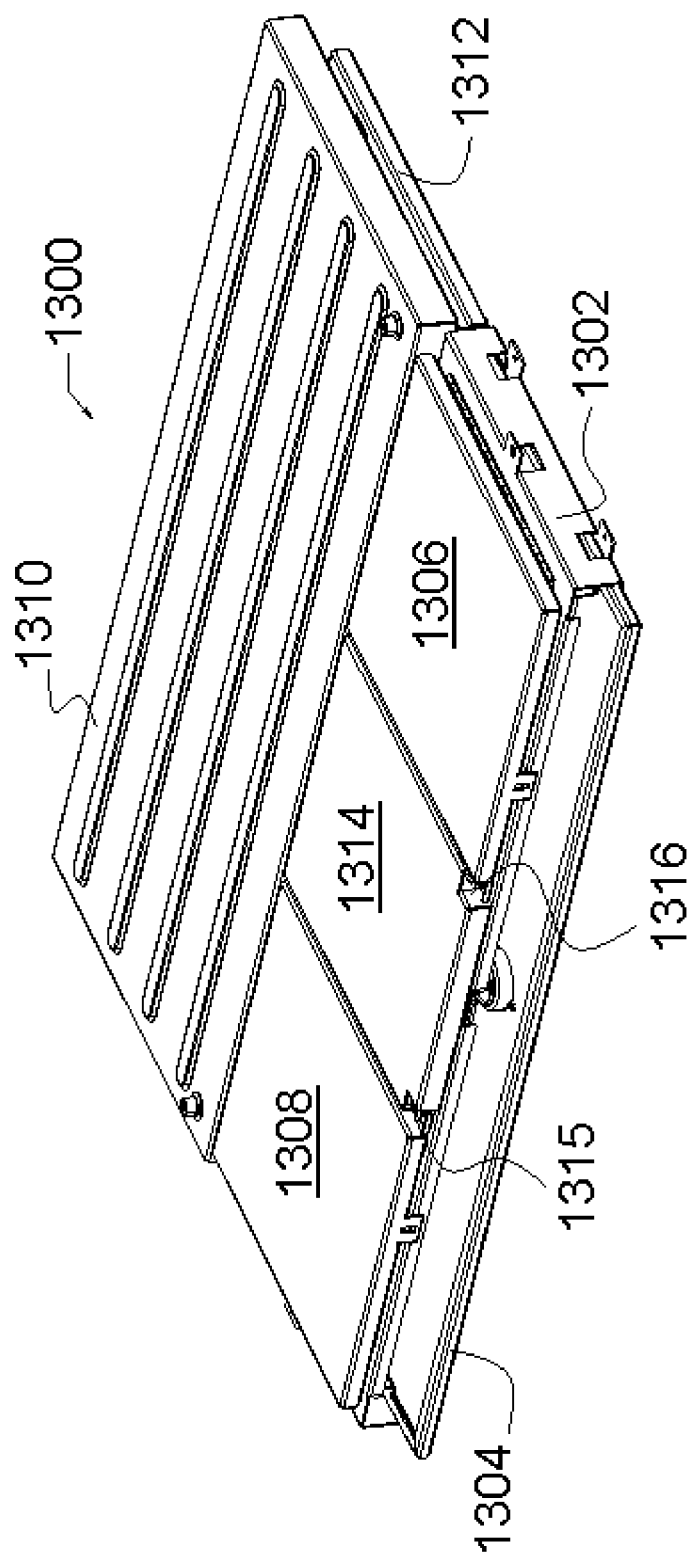

As shown in the example of FIG. 13D, a collapsed or folded position of the storage container 1300 allows the top panel 1310 to fold and rest on the back panel 1312. Side panels 1306, 1308 rest on the base 1302. Note that side panel 1308 is not shown in the example of FIG. 13D to allow a view of the base 1302 upon which the side panels 1306, 1308 rest in the collapsed or folded position of the container 1300. Front panel 1304 slides under the base 1302.

In certain examples, as shown in FIG. 13D, each of the side panels 1306, 1308 abuts a raised portion 1314 of the base panel 1302 when in the collapsed position. In other examples, the side panels 1306, 1308 abut each other when in the collapsed position. If the raised portion 1314 is present, the raised portion 1314 can include notches 1315, 1316 into which the side panels 1306, 1308 can removably latch, click, or otherwise connect. In this way, side panels 1306, 1308 are secured from bouncing or otherwise moving against the base 1302.

In certain examples, the raised portion 1314 provides support to the base 1302 (e.g., to keep the base 1302 from sagging) absent truss(es). Proper support allows the front panel 1304 to slide unimpeded under the base 1302. Depending upon a length of the base 1302 and material of the base 1302, the raised portion 1314 may or may not be useful in providing additional rigidity or support. Absent the raised portion 1314, the interior of the container 1300 can be kept protected when in the collapsed position.

In certain examples, a storage container may not be collapsible. Instead, the container or box may remain erected at all times, and a front panel of the container is able to swing out and slide under a base panel (e.g., between the base panel and a container bottom), guided and constrained by a mechanism such as cam-shaped discs, pin and groove alignment, hook and ball, block and hinge, etc. Additionally, a top of the container can be opened or closed, and the front and top panels are movable independent of each other (e.g., the top can be open and the front can be down, the top can be down and the front can be open, the top can be open and the front can be up, etc.).

Conclusion

Thus, certain examples provide a collapsible automobile storage container constructed from a metallic or other rigid material. Certain examples provide a plurality of panels, arranged with respect to a base, that are removably connected to each other and configured to be erected (e.g., "un-collapsed") to form an enclosed storage area and collapsed to lay flat (e.g., on a bed of a vehicle, trailer, etc.).

An example collapsible automobile storage container includes a plurality of panels arranged with respect to a base. The plurality of panels are interconnected to form an enclosed storage area when erected. The plurality of panels are movable into both a collapsed position and an erected position. The plurality of panels include at least a top panel, a front panel, a back panel, and two side panels, the front panel movable to slide under the base of the container. The example includes a control device to grab and constrain the front panel in position to 1) swing vertically into an erected position against the side panels and base and to 2) keep the front panel from being pulled beyond a front edge of the base.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A collapsible automobile storage container comprising:
a plurality of panels arranged with respect to a base, the plurality of panels interconnected to form an enclosed storage area when erected, the plurality of panels movable into both a collapsed position and an erected position, the plurality of panels including at least a top panel, a front panel, a back panel, and two side panels, the front panel movable to slide under the base of the container; and
a control device to grab and constrain the front panel in position to 1) swing vertically into an erected position against the side panels and base and to 2) keep the front panel from being pulled beyond a front edge of the base, wherein the control device comprises two or more cam-shaped discs attached to a bottom of the front panel to guide movement and position of the front panel with respect to the base of the container.

2. The container of claim 1, further comprising a bottom below the base of the container, the base connected to the bottom to form a cavity between the base and the bottom, the cavity accommodating the front panel when the front panel is moved under the base.

3. The container of claim 2, wherein the control device is arranged to keep the front panel from inadvertently being pulled out of the cavity created between the base and the bottom of the container.

4. The container of claim 2, wherein the front panel spans an entire opening from side to side of the cavity created by the bottom and base of the container.

5. The container of claim 1, wherein each of the plurality of panels comprises at least one of a plastic panel or a metal panel.

6. The container of claim 1, wherein the automobile comprises at least one of a truck, an all-terrain vehicle, a recreational vehicle, or a trailer.

7. The container of claim 1, wherein the container is incorporated into a liner for the automobile.

8. The container of claim 1, wherein the container is configured for arrangement either horizontally or vertically in a bed of an automobile.

9. The container of claim 1, wherein, in the collapsed position, the side panels lay side by side, the top panel lays on top of the back panel, and a combination of the top panel laying on top of the back panel lays alongside the side panels.

10. The container of claim 1, further comprising at least one of tapered latch hooks or rubber hooks connecting panels of the container.

11. The container of claim 1, further comprising tongue and groove connecting panels of the container.

12. The container of claim 1, wherein the cam-shaped discs comprise at least one of circle cam discs, square cam discs, or trapezoidal cam discs.

13. The container of claim 1, wherein the control device further comprises a pin and groove alignment of the front panel and the base.

14. The container of claim 1, wherein the control device further comprises a hook and ball connecting and guiding the front panel with respect to the base.

15. The container of claim 1, wherein the control device further comprises a block and hinge connecting and guiding the front panel with respect to the base.

16. The container of claim 1, wherein the top panel is attached to the back panel such that the top panel is openable with respect to the back panel and side panels.

17. The container of claim 1, wherein the front panel comprises a lock to secure the container in at least one of the erected position and the collapsed position.

18. The container of claim 17, wherein the top panel is movable to be opened or closed with respect to the back panel and side panels when the front panel is locked.

19. The container of claim 1, wherein the front panel is movable when the top panel is down and wherein the top panel is movable when the front panel is up.

20. A collapsible automobile storage container comprising:
a plurality of panels arranged with respect to a base, the plurality of panels interconnected to form an enclosed storage area when erected, the plurality of panels movable into both a collapsed position and an erected position, the plurality of panels including at least a top panel, a front panel, a back panel, and two side panels, the front panel movable to slide under the base of the container; and
a control device to grab and constrain the front panel in position to 1) swing vertically into an erected position against the side panels and base and to 2) keep the front panel from being pulled beyond a front edge of the base, wherein the control device comprises a hook and ball connecting and guiding the front panel with respect to the base.

* * * * *